US006728725B2

(12) United States Patent
Garfield et al.

(10) Patent No.: US 6,728,725 B2
(45) Date of Patent: Apr. 27, 2004

(54) PROCESS FOR CREATING AND DISPLAYING A PUBLICATION HISTORIOGRAPH

(75) Inventors: Eugene Garfield, Bryn Mawr, PA (US); Vladimir S. Istomin, Pullman, WA (US); Alexander I. Pudovkin, Vladivostok (RU)

(73) Assignee: Eugene Garfield, Ph.D., Philadelphia, PA (US)

( * ) Notice: Subject to any disclaimer, the term of this patent is extended or adjusted under 35 U.S.C. 154(b) by 0 days.

(21) Appl. No.: 10/136,488

(22) Filed: May 2, 2002

(65) Prior Publication Data

US 2003/0001873 A1 Jan. 2, 2003

Related U.S. Application Data

(60) Provisional application No. 60/289,616, filed on May 8, 2001.

(51) Int. Cl.⁷ .............................. G06F 17/00; G06F 7/00
(52) U.S. Cl. ................................. 707/102; 707/104.1
(58) Field of Search ........................ 707/100, 101, 707/102, 104.1, 3; 345/700

(56) References Cited

U.S. PATENT DOCUMENTS

| | | | | |
|---|---|---|---|---|
| 5,594,897 A | * | 1/1997 | Goffman ..................... 707/102 |
| 5,808,615 A | * | 9/1998 | Hill et al. .................... 345/853 |
| 5,857,185 A | * | 1/1999 | Yamaura ....................... 705/5 |
| 5,895,470 A | | 4/1999 | Pirolli et al. ................ 707/102 |
| 5,991,751 A | | 11/1999 | Rivette et al. .................. 707/1 |
| 6,038,574 A | | 3/2000 | Pitkow et al. ............... 707/513 |
| 6,182,091 B1 | | 1/2001 | Pitkow et al. ............. 715/501.1 |
| 6,256,648 B1 | * | 7/2001 | Hill et al. ................. 715/501.1 |
| 6,286,018 B1 | * | 9/2001 | Pitkow et al. ............... 715/513 |
| 6,289,342 B1 | | 9/2001 | Lawrence et al. .............. 707/7 |
| 6,499,026 B1 | * | 12/2002 | Rivette et al. ............... 349/141 |
| 6,505,196 B2 | * | 1/2003 | Drucker et al. ................ 707/5 |

OTHER PUBLICATIONS

Buter, R.K. and Noyons, E.C.M., Improving the Functionality of Interactive Bibliometric Science Maps. *Scientometrics*, vol. 51 (2001) pp. 55–68.

Cawkell, A.E., Search Strategies Using the Science Citation Index. *Essays of an Information Scientist*, vol. 1 (Nov. 4, 1969) pp. 49–62, 1962–73. Reprinted from: *Computer Based Information Retrieval Systems*, London: Clive Bingley Ltd., 1968.

(List continued on next page.)

*Primary Examiner*—Greta Robinson
*Assistant Examiner*—Susan Rayyan
(74) *Attorney, Agent, or Firm*—Drinker Biddle & Reath LLP

(57) ABSTRACT

An automated process adaptable to execution by computer for creating a comprehensive historiograph of bibliographic information for subjects, authors, journals and publications of several varieties. The process begins with seed information processed through a database of bibliographic information, which database can contain citation index data, full text publications, or other compilations of publication information. The process assembles a data store comprising publications citing and cited by other publications related to the seed information, then organizes that data store for dynamic display of the assembled historiograph information in various graphic forms either on screen or printed. The display includes hyperlinks to sorted tables of publication information that instantly display key elements of the historiograph to the user.

21 Claims, 27 Drawing Sheets

OTHER PUBLICATIONS

Cawkell, A.E., Acoustic Journals and Acoustic Research Activities. *Current Contents No. 44*, (Oct. 30, 1989) 3–15. Reprinted in Garfield, E., *Essays of an Information Scientist*, vol. 12 pp. 301–313. Philadelphia: ISI Press, 1977.

Cawkell, A.E., Visualizing Citation Connections. B. Cronin & H. Barsky Atkins (Eds), *The Web of Knowledge: A Festschrift in Honor of Eugene Garfield*, ASIS Monographic Series pp. 177–194. Medford, NJ: Information Today, Inc., 2000.

Garfield, E., Sher I.H., & Torpie R.J., The Use of Citation Data in Writing the History of Science. *Report of research for Air Forces Office of Scientific Research under contract AFA9(638)–1256*. Philadelphia: The Institute for Scientific Information, Dec. 1964.

Garfield, E., Citation Indexing, Historio–bibliography and the Sociology of Science Biography. *Current Contents No. 6* (Apr. 14, 1971). Reprinted from: K.E. Davis & W.D. Sweeney (Eds). *Proceedings of the Third International Congress of Medical Librarianship* May 5–9, 1969, pp. 187–204. Amsterdam: Excerpta Medica. Reprinted in Garfield E., *Essays of an Information Scientist*, vol. 1, pp. 158–174. Philadelphia: ISI Press (1977).

Garfield, E., Historiographs, Librarianship, and the History of Science. *Essays of an Information Scientist*, vol. 2 (1974–1976) pp. 136–150. Reprinted from: In *Toward a Theory of Librarianship: Papers in Honor of Jesse Hauk Sherra*, ed. By Conrad H. Rawski, pp. 380–402. Metuchen, N.J.: Scarecrow Press, 1973.

Garfield, E., Contract Research Services at ISI—Citation Analysis for Governmental, Industrial, and Academic Clients, *Current Contents No. 23* (Jun. 8, 1992) pp. 5–13. Reprinted Garfield E. (1993). *Essays of an Information Scientist*, vol. 15, pp. 75–83. Philadelphia: ISI Press (1993).

Lawrence S., Giles, C.L., & Bollacker K., Digital Libraries and Autonomous Citation Indexing, *IEEE Computer*, vol. 32 (1999) pp. 67–71.

White, H.D. and McCain K.W., Visualization of Literatures. *Annual Review of Information Science and Technology*, vol. 32 (1997) pp. 99–168.

Small, H. and Garfield, E., The Geography of Science: Disciplinary and National Mappings. *Journal of Information Science*, vol. 11, (1985) pp. 147–159. Reprinted in Garfield E. *Current Contents No. 43* (Oct. 27, 1986) pp. 3–14. Reprinted in Garfield E., *Essays of an Information Scientist*, vol. 9 (1988) pp. 324–335. Philadelphia: ISI Press.

Small, H., A Sci–Map Case Study: Building a Map of AIDS Research. *Scientometrics*, vol. 30 (1994) pp. 229–241.

Small, H., Sweeney, E., and Greenlee, E., Clustering the Science Citation Index Using Co–Citations. II. Mapping Science. *Scientometrics*, vol. 8 (1985) pp. 321–340.

Garfield, E. Current Comments, *Current Contents No. 38* (Sep. 18, 1974) pp. 134–135.

Small, H. Co–Citation in the Scientific Literature: A New Measure of the Relationship Between Two Documents. *Journal of the American Society for Information Science*, vol. 24, No. 4 (Jul.–Aug. 1973) pp. 28–31.

\* cited by examiner

| cites | nodes | cited |
|---|---|---|
| (0) | 0 RYMAN-N-1980-V34-P1037 | (2 3 4 5 6 7 8 10 12 13 15 16 17 18 23 53 88 89 93 99 100 101 103 109 113 116 120 122 150 162 212 236 283 310 349 355) [36] |
| (0) | 1 REUTERWALL-C-1981-V37-P39 | (7 9 22) [3] |
| (0) [1] | 2 FELDHAMER-GA-1982-V63-P512 | (19 78 113) [3] |
| (0) [1] | 3 PETERSON-RO-1982-V60-P2812 | (29) [1] |
| (0) [1] | 4 MUELLER-LD-1982-V40-P127 | (81 146 255 327) [4] |
| (0) [1] | 5 KIJIMA-A-1982-V48-P1703 | (140 141 324) [3] |
| (0) [1] | 6 DOUGLAS-ME-1982-V99-P777 | (11 27 39 89 107 117 121 128 222 232 291 313 321) [13] |
| (1 0) [2] | 7 CHESSER-RK-1982-V39-P125 | (20 30 116 212 310) [5] |
| (0) [1] | 8 THORPE-JP-1982-V13-P139 | (14 21 24 26 38 40 41 42 47 51 55 58 61 67 68 72 74 75 76 92 106 112 115 121 130 133 135 139 152 155 160 168 178 182 192 198 221 227 234 246 247 256 260 265 316 318 332 335 336 343 350 356) [52] |
| (1) [1] | 9 BRITTON-RH-1982-V53-P146 | (69 71 261 302 340) [5] |
| (0 17) [2] | 10 GYLLENSTEN-U-1983-V51-P561 | (103 104 109 116 122 310 349) [7] |
| (6) [1] | 11 DIETZ-EJ-1983-V32-P21 | (27 39 62 89 95 102 107 144 148 248 268 306 334) [13] |
| (0) [1] | 12 BEKELE-E-1983-V99-P73 | (37 48 163) [3] |
| (0) [1] | 13 CHESSER-RK-1983-V37-P320 | (20 46 53 119 125 137 154 212 217 236 339) [11] |
| (8) [1] | 14 MCNEILL-CI-1983-V66-P257 | (36 51 64 70 80 123 138 142) [8] |
| (0) [1] | 15 COTHRAN-EG-1983-V32-P360 | (85 89 148 164) [4] |
| (0) [1] | 16 OBRIEN-SJ-1983-V221-P459 | (25 28 31 44 49 54 66 73 83 93 97 98 99 116 145 153 155 166 213 215 235 236 239 274 305 326) [26] |
| (0) [1] | 17 RYMAN-N-1983-V33-P93 | (10 56 59 88 103) [5] |
| (0) [1] | 18 SHAKLEE-JB-1983-V81-P85 | (34 60) [2] |
| (2) [1] | 19 VANTUINEN-P-1983-V74-P473 | (78 165) [2] |
| (7 13) [2] | 20 SCRIBNER-KT-1983-V64-P287 | (346) [1] |
| (8) [1] | 21 STEVENS-PF-1983-V32-P285 | (33 42) [2] |
| (1) [1] | 22 JOHNSON-CN-1983-V14-P152 | (134 315) [2] |
| (0) [1] | 23 BERGLUND-A-1983-V77-P49 | (32 86) [2] |

Fig. 1

| 12 | Author | Bekele E |
|---|---|---|
| | Title | The Neutralist-Selectionist Debate and Estimates of Allozyme Multilocus Structure in Conservation Genetics of the Primitive Land Races of Ethiopian Barley |
| | Journal | HEREDITAS 99(1):73-88 |
| | Year | 1983 |
| | Type | Article |
| | Refs | 112 |
| | cited | (37 48 163) [3] |
| | cites | (0) [1] |

Fig. 9

Ranged Author list.

| Name | nodes |
|---|---|
| Wildt DE | (16 28 35 49 83 97 133 153 166 274 305 333)[12] |
| Obrien SJ | (16 35 97 133 145 155 166 235 256 257 274)[11] |
| Bush M | (16 28 35 49 97 153 166 274 305 333)[10] |
| Ryman N | (0 7 10 17 100 109 120 212 329)[9] |
| Thorpe JP | (8 72 115 234 265 335)[6] |
| Thiellement H | (70 90 127 131 183 251)[6] |
| Goldman D | (16 35 44 145 225 280)[6] |
| Chesser RK | (7 13 20 154 212)[5] |
| Smith MH | (15 93 101 164 217)[5] |
| Gyllensten U | (10 100 103 109 120)[5] |
| Reuterwall C | (0 1 7 10)[4] |
| Maxson LR | (74 160 168 247)[4] |
| Devienne D | (70 90 127 179)[4] |
| Feldhamer GA | (2 19 78 113)[4] |
| Murray J | (68 182 227 343)[4] |
| Bekele E | (12 37 48 163)[4] |
| Jain SK | (14 36 51 80)[4] |
| Johnson MS | (68 182 227 343)[4] |
| Martin PG | (67 108 325 356)[4] |
| Wilson AC | (45 94 220 242)[4] |
| Chakraborty PK | (28 49 83 333)[4] |
| Dowd JM | (67 325 356)[3] |
| Shaklee JB | (18 34 60)[3] |
| Evermann JF | (97 215 326)[3] |
| Desfrancs CC | (90 131 251)[3] |
| Douglas ME | (6 89 291)[3] |
| Graur D | (57 157 328)[3] |
| Howard JG | (166 305 333)[3] |
| Warwick SI | (138 278 348)[3] |
| Weir BS | (53 289 293)[3] |
| Meltzer D | (28 49 97)[3] |
| Duncan WR | (98 186 199)[3] |
| Stevens PF | (21 33 279)[3] |
| Grantham R | (99 207 254)[3] |
| Barrett SCH | (102 167 357)[3] |

Fig. 10

Ranged Journal list.

| Title | nodes |
|---|---|
| EVOLUTION | (167 93 204 212 155 157 53 292 273 13 0 235 135 138 277 283 339 160)[18] |
| SYSTEMATIC ZOOLOGY | (178 58 143 319 91 260 106 39 21 11 152 15)[12] |
| JOURNAL OF MAMMALOGY | (113 2 154 256 266 30 20 153 164)[9] |
| NATURE | (132 133 211 213 214 219 254 147 309)[9] |
| HEREDITY | (88 216 10 227 116 327 68 249)[8] |
| THEORETICAL AND APPLIED GENETICS | (80 197 14 70 130 251 131 358)[8] |
| HEREDITAS | (12 37 109 120 48 310 156 163)[8] |
| GENETICS | (195 205 218 40 242 118 289 338)[8] |
| CANADIAN JOURNAL OF ZOOLOGY JOURNAL CANADIEN DE ZOOLOGIE | (169 104 268 306 307 151 340 161)[8] |
| MOLECULAR BIOLOGY AND EVOLUTION | (168 185 189 295 231 238)[6] |
| ANNUAL REVIEW OF ECOLOGY AND SYSTEMATICS | (8 334 312 42 298 136)[6] |
| IMMUNOGENETICS | (184 98 124 267 288 66)[6] |
| COPEIA | (192 217 221 101 34 321)[6] |
| OECOLOGIA | (64 134 229 128 9)[5] |
| MARINE BIOLOGY | (23 92 332 115 335)[5] |
| SYSTEMATIC BOTANY | (180 102 278 142 33)[5] |
| AMERICAN JOURNAL OF PHYSICAL ANTHROPOLOGY | (248 95 236 148 59)[5] |
| BIOCHEMICAL SYSTEMATICS AND ECOLOGY | (240 123 301 350)[4] |
| JOURNAL OF WILDLIFE MANAGEMENT | (172 43 29 272)[4] |
| BIOLOGY OF REPRODUCTION | (28 269 305 333)[4] |
| JOURNAL OF EXPERIMENTAL MARINE BIOLOGY AND ECOLOGY | (69 234 265 261)[4] |
| SCIENCE | (35 97 52 16)[4] |
| JOURNAL OF MOLECULAR EVOLUTION | (173 47 45 353)[4] |
| PLANT AND SOIL | (210 299 87 158)[4] |
| ENVIRONMENTAL BIOLOGY OF FISHES | (170 162 259 345)[4] |
| AMERICAN ZOOLOGIST | (111 313 24)[3] |
| FISHERY BULLETIN | (285 18 60)[3] |

Fig. 11

Highly cited works outside of current historiograph.

```
54 : SNEATH-PHA-1973-NUMERICAL-TAXONOMY
49 : NEI-M-1972-AM-NAT-V106-P283
44 : NEI-M-1975-MOL-POPULATION-GENET
41 : NEI-M-1978-GENETICS-V89-P583
31 : NEVO-E-1978-THEOR-POP-BIOL-V13-P121
29 : SELANDER-RK-1971-U-TEXAS-PUBL-V7103-P49
27 : WILSON-AC-1977-ANNU-REV-BIOCHEM-V46-P573
26 : HARRIS-H-1976-HDB-ENZYME-ELECTROPH
24 : SHAW-CR-1970-BIOCHEM-GENET-V4-P297
23 : OFARRELL-PH-1975-J-BIOL-CHEM-V250-P4007
23 : WRIGHT-S-1978-EVOLUTION-GENETICS-P-V4
22 : SOKAL-RR-1969-BIOMETRY
21 : MANTEL-N-1967-CANCER-RES-V27-P209
20 : LEWONTIN-RC-1974-GENETIC-BASIS-EVOLUT
19 : SOKAL-RR-1981-BIOMETRY
19 : FITCH-WM-1967-SCIENCE-V155-P279
18 : AVISE-JC-1974-SYST-ZOOL-V23-P465
18 : ROGERS-JS-1972-U-TEXAS-PUBLICATION-V7213-P145
17 : SOKAL-RR-1979-SYSTEMATIC-ZOOLOGY-V28-P227
17 : SARICH-VM-1977-NATURE-V265-P24
16 : NEI-M-1974-GENETICS-V76-P379
16 : FARRIS-JS-1972-AM-NAT-V106-P645
16 : AYALA-FJ-1975-EVOLUTIONARY-BIOLOGY-V8-P1
15 : AVISE-JC-1982-EVOL-BIOL-V15-P151
15 : NEI-M-1975-EVOLUTION-V29-P1
14 : WRIGHT-S-1965-EVOLUTION-V19-P395
14 : CROW-JF-1970-INTRO-POPULATION-GEN
13 : KING-MC-1975-SCIENCE-V188-P107
13 : NEI-M-1973-P-NATL-ACAD-SCI-USA-V70-P3321
12 : BONNELL-ML-1974-SCIENCE-V184-P908
12 : RYMAN-N-1977-HEREDITAS-V85-P157
12 : WORKMAN-PL-1970-AM-J-HUM-GENET-V22-P24
11 : FUERST-PA-1977-GENETICS-V86-P455
11 : MAYR-E-1963-ANIMAL-SPECIES-EVOLU
11 : GORMAN-GC-1979-COPEIA-P242
11 : FARRIS-JS-1981-ADV-CLADISTICS-P3
11 : SELANDER-RK-1973-P-NATL-ACAD-SCI-USA-V70-P1875
11 : SELANDER-RK-1976-MOL-EVOLUTION-P21
11 : HENNIG-W-1966-PHYLOGENETIC-SYSTEMA
11 : SWOFFORD-DL-1981-J-HERED-V72-P281
11 : NEI-M-1977-ANN-HUM-GENET-V41-P225
11 : CHAKRABORTY-R-1978-GENETICS-V88-P367
10 : CHAKRABORTY-R-1980-GENETICS-V94-P1039
10 : ALLENDORF-FW-1979-FISH-PHYSL-V8-P407
10 : SOUTHERN-EM-1975-J-MOL-BIOL-V98-P503
10 : FITCH-WM-1976-MOL-EVOLUTION-P160
10 : NEI-M-1971-AM-NAT-V105-P385
10 : RAMSEY-PR-1979-J-WILDLIFE-MANAGE-V43-P136
10 : SOKAL-RR-1963-PRINCIPLES-NUMERICAL
10 : MANLOVE-MN-1976-P-SE-ASS-GAME-FISH-C-V30-P487
```

Fig. 12

Potentially missed citations...

0 RYMAN-N-1980-V34-P1037
CHESSER-RK-0000-INT-ZOO-YB
CHESSER-RK-0000-J-WILDL-MGMT
MANLOVE-MN-0000-3RD-P-ANN-INT-S-BLAC
RYMAN-N-0000-OKIOS
SMITH-MH-0000-BIOL-WHITE-TAILED-DE

1 REUTERWALL-C-1981-V37-P39
LINDSTEN-J-0000-HUMAN-GENETICS
RYMAN-N-0000-EVOLUTION

35 OBRIEN-SJ-1984-V223-P1127
OBRIEN-SJ-1983-SCIENCE-V221-P460 may refer to 16 OBRIEN-SJ-1983-V221-P459

43 VANBALLENBERGHE-V-1984-V48-P1425
PETERSON-RO-1984-WILDL-MONOGR-V88 may refer to 29 PETERSON-RO-1984-V88-P1

45 BEVERLEY-SM-1984-V21-P1
NEI-M-1984-EVOL-BIOL-V17 may refer to 57 NEI-M-1984-V17-P73

50 LISTER-AM-1984-V82-P205
CHAPMAN-DI-0000-J-ZOOL-LOND
GROVES-CP-0000-BIOL-MANAGEMENT-CERV
LISTER-AM-0000-BIOL-MANAGEMENT-CERV
SCOTT-KM-0000-BIOL-MANAGEMENT-CERV
TURNER-DC-0000-BIOL-MANAGEMENT-CERV
WEST-B-1982-UNPUB-ROMAN-BUILDING

52 PETERSON-RO-1984-V224-P1350
KEITH-LB-0000-COMMUNICATION
PETERSON-RO-0000-UNPUB
PETERSON-RO-1982-CAN-J-ZOOL-V60-P2816 may refer to 3 PETERSON-RO-1982-V60-P2812

57 NEI-M-1984-V17-P73
OBRIEN-SJ-1983-SCIENCE-V221-P460 may refer to 16 OBRIEN-SJ-1983-V221-P459

84 EULER-D-1985-V61-P176
-1980-UNPUB-MOOSE-MANAGEME
BISSET-A-1978-UNPUB-MOOSE-PROBLEM
FLEMMING-ST-1976-UNPUB-MOOSE-HABITAT
MORRISON-KP-1978-UNPUB-MOOSE-PROBLEM
PETERSON-RO-1984-WILDL-MONOGR-V88 may refer to 29 PETERSON-RO-1984-V88-P1
THOMPSON-I-1978-UNPUB-MOOSE-PROBLEM

151 MESSIER-F-1985-V63-P239
MESSIER-F-1985-CAN-J-ZOOL-V63 may refer to 151 MESSIER-F-1985-V63-P239
MESSIER-F-1985-CAN-J-ZOOL-V63 may refer to 161 MESSIER-F-1985-V63-P1068
PETERSON-RO-1984-WILDL-MONOGR-V88 may refer to 29 PETERSON-RO-1984-V88-P1

170 HOURIGAN-TF-1986-V15-P161

174 HOLEKAMP-KE-1986-V56-P365

191 DUPONT-E-1986-V28-P119
KLEIN-J-1985-VOX-SANG-V49-P359 may refer to 96 KLEIN-J-1985-V49-P354

242 CHAPMAN-BS-1986-V112-P79
NEI-M-1984-EVOL-BIOL-V17-P57 may refer to 57 NEI-M-1984-V17-P73

284 PARKER-GR-1986-V39-P180

Fig. 13

Nodes: 379
Sorted by year, journal, volume, page.

| Cited nodes | Nodes / Authors | GCS | LCS |
|---|---|---|---|
| 0 | 0 1977 AUSTRALIAN JOURNAL OF PLANT PHYSIOLOGY 4(1):143-158<br>ANDERSON RL; CLARKE AE; JERMYN MA; KNOX RB; STONE BA<br>*CARBOHYDRATE-BINDING ARABINOGALACTAN-PROTEIN FROM LIQUID SUSPENSION CULTURES OF ENDOSPERM FROM LOLIUM-MULTIFLORUM* | 76 | 38 |
| 1 | 1 1978 PROCEEDINGS OF THE AUSTRALIAN BIOCHEMICAL SOCIETY 11():33-33<br>GLEESON PA; CLARKE AE; JERMYN MA; KNOX RB<br>*ARABINOGALACTAN PROTEINS OF FEMALE REPRODUCTIVE TISSUES OF GLADIOLUS-GANDAVENSIS* | 1 | 1 |
| 2 | 2 1979 ANALYTICAL BIOCHEMISTRY 92(1):41-45<br>GLEESON PA; JERMYN MA; CLARKE AE<br>*ISOLATION OF AN ARABINOGALACTAN PROTEIN BY LECTIN AFFINITY CHROMATOGRAPHY ON TRIDACNIN-SEPHAROSE-4B* | 14 | 4 |
| 3 | 3 1979 BIOCHEMICAL JOURNAL 181(3):607-&<br>GLEESON PA; CLARKE AE<br>*STRUCTURAL STUDIES ON THE MAJOR COMPONENT OF GLADIOLUS STYLE MUCILAGE, AN ARABINOGALACTAN-PROTEIN* | 52 | 25 |
| 4 | 4 1979 FEDERATION PROCEEDINGS 38(3):418-418<br>MANI UV; AKIYAMA Y; MOHRLOK S; LAMPORT DTA<br>*DEGLYCOSYLATION VIA HF SOLVOLYSIS OF ARABINOGALACTAN PROTEINS (AGPS) FROM SYCAMORE SUSPENSION CULTURES* | 4 | 2 |
| 5 | 5 1979 PHYTOCHEMISTRY 18(4):521-540<br>CLARKE AE; ANDERSON RL; STONE BA<br>*FORM AND FUNCTION OF ARABINOGALACTAN-PROTEINS* | 253 | 105 |
| 6 | 6 1979 PLANT PHYSIOLOGY 63(5):31-31<br>MANI UV; AKIYAMA Y; MOHRLOK S; LAMPORT DTA<br>*EVIDENCE FOR A NEW GLYCOPEPTIDE LINKAGE, GLUCOSYL HYDROXYPROLINE, IN ARABINOGALACTAN PROTEINS* | 0 | 0 |
| 7 | 7 1980 BIOCHEMICAL JOURNAL 191(2):437-447<br>GLEESON PA; CLARKE AE<br>*ANTIGENIC DETERMINANTS OF A PLANT PROTEOGLYCAN, THE GLADIOLUS STYLE ARABINOGALACTAN-PROTEIN* | 26 | 6 |

Fig. 14

2 1979 ANALYTICAL BIOCHEMISTRY 92(1):41-45
GLEESON PA; JERMYN MA; CLARKE AE
ISOLATION OF AN ARABINOGALACTAN PROTEIN BY LECTIN AFFINITY CHROMATOGRAPHY ON
TRIDACNIN-SEPHAROSE-4B cites:

0 1977 AUSTRALIAN JOURNAL OF PLANT PHYSIOLOGY 4(1):143-158
ANDERSON RL; CLARKE AE; JERMYN MA; KNOX RB; STONE BA
CARBOHYDRATE-BINDING ARABINOGALACTAN-PROTEIN FROM LIQUID SUSPENSION CULTURES OF
ENDOSPERM FROM LOLIUM-MULTIFLORUM 1 1978 PROCEEDINGS OF THE AUSTRALIAN BIOCHEMICAL SOCIETY 110:33-33
GLEESON PA; CLARKE AE; JERMYN MA; KNOX RB
ARABINOGALACTAN PROTEINS OF FEMALE REPRODUCTIVE TISSUES OF GLADIOLUS-GANDAVENSIS

Fig. 15

2 1979 ANALYTICAL BIOCHEMISTRY 92(1):41-45
GLEESON PA; JERMYN MA; CLARKE AE
ISOLATION OF AN ARABINOGALACTAN PROTEIN BY LECTIN AFFINITY CHROMATOGRAPHY ON
TRIDACNIN-SEPHAROSE-4B 3 1979 BIOCHEMICAL JOURNAL 181(3):607-&
GLEESON PA; CLARKE AE
STRUCTURAL STUDIES ON THE MAJOR COMPONENT OF GLADIOLUS STYLE MUCILAGE, AN
ARABINOGALACTAN-PROTEIN 7 1980 BIOCHEMICAL JOURNAL 191(2):437-447
GLEESON PA; CLARKE AE
ANTIGENIC DETERMINANTS OF A PLANT PROTEOGLYCAN, THE GLADIOLUS STYLE
ARABINOGALACTAN-PROTEIN 30 1985 ANALYTICAL BIOCHEMISTRY 148(2):446-450
VANHOLST GJ; CLARKE AE
QUANTIFICATION OF ARABINOGALACTAN-PROTEIN IN PLANT-EXTRACTS BY SINGLE RADIAL GEL-
DIFFUSION 35 1986 PLANT PHYSIOLOGY 80(3):786-789
VANHOLST GJ; CLARKE AE
ORGAN-SPECIFIC ARABINOGALACTAN-PROTEINS OF LYCOPERSICON-PERUVIANUM (MILL)
DEMONSTRATED BY CROSSED ELECTROPHORESIS cited by:

Fig. 16

Nodes: 379
Sorted by LCS.

| Cited nodes | Nodes / Authors | GCS | LCS |
|---|---|---|---|
| 10 | 16 1983 ANNUAL REVIEW OF PLANT PHYSIOLOGY AND PLANT MOLECULAR BIOLOGY 34():47-70<br>FINCHER GB; STONE BA; CLARKE AE<br>*ARABINOGALACTAN-PROTEINS - STRUCTURE, BIOSYNTHESIS, AND FUNCTION* | 298 | 166 |
| 1 | 5 1979 PHYTOCHEMISTRY 18(4):521-540<br>CLARKE AE; ANDERSON RL; STONE BA<br>*FORM AND FUNCTION OF ARABINOGALACTAN-PROTEINS* | 253 | 105 |
| 5 | 62 1991 PLANT JOURNAL 1(3):317-326<br>KNOX JP; LINSTEAD PJ; PEART J; COOPER C; ROBERTS K<br>*DEVELOPMENTALLY REGULATED EPITOPES OF CELL-SURFACE ARABINOGALACTAN PROTEINS AND THEIR RELATION TO ROOT-TISSUE PATTERN-FORMATION* | 132 | 101 |
| 3 | 61 1991 PLANT CELL 3(12):1317-1326<br>PENNELL RI; JANNICHE L; KJELLBOM P; SCOFIELD GN; PEART JM; ROBERTS K<br>*DEVELOPMENTAL REGULATION OF A PLASMA-MEMBRANE ARABINOGALACTAN PROTEIN EPITOPE IN OILSEED RAPE FLOWERS* | 103 | 86 |
| 8 | 48 1989 JOURNAL OF CELL BIOLOGY 108(5):1967-1977<br>PENNELL RI; KNOX JP; SCOFIELD GN; SELVENDRAN RR; ROBERTS K<br>*A FAMILY OF ABUNDANT PLASMA-MEMBRANE ASSOCIATED GLYCOPROTEINS RELATED TO THE ARABINOGALACTAN PROTEINS IS UNIQUE TO FLOWERING PLANTS* | 108 | 82 |
| 11 | 99 1993 PLANTA 189(2):243-248<br>KREUGER M; VANHOLST GJ<br>*ARABINOGALACTAN PROTEINS ARE ESSENTIAL IN SOMATIC EMBRYOGENESIS OF DAUCUS-CAROTA L* | 90 | 73 |

Fig. 17

Nodes: 379
Sorted by GCS.

| Cited nodes | Nodes / Authors | GCS | LCS |
|---|---|---|---|
| 14 | 89 1993 PLANT CELL 5(1):9-23<br>SHOWALTER AM<br>*STRUCTURE AND FUNCTION OF PLANT-CELL WALL PROTEINS* | 346 | 67 |
| 10 | 16 1983 ANNUAL REVIEW OF PLANT PHYSIOLOGY AND PLANT MOLECULAR BIOLOGY 340:47-70<br>FINCHER GB; STONE BA; CLARKE AE<br>*ARABINOGALACTAN-PROTEINS - STRUCTURE, BIOSYNTHESIS, AND FUNCTION* | 298 | 166 |
| 1 | 5 1979 PHYTOCHEMISTRY 18(4):521-540<br>CLARKE AE; ANDERSON RL; STONE BA<br>*FORM AND FUNCTION OF ARABINOGALACTAN-PROTEINS* | 253 | 105 |
| 2 | 90 1993 PLANT CELL 5(10):1265-1275<br>MCCORMICK S<br>*MALE GAMETOPHYTE DEVELOPMENT* | 146 | 6 |
| 12 | 121 1994 PLANT JOURNAL 5(2):157-172<br>KIELISZEWSKI MJ; LAMPORT DTA<br>*EXTENSIN - REPETITIVE MOTIFS, FUNCTIONAL SITES, POSTTRANSLATIONAL CODES, AND PHYLOGENY* | 146 | 46 |
| 5 | 62 1991 PLANT JOURNAL 1(3):317-326<br>KNOX JP; LINSTEAD PJ; PEART J; COOPER C; ROBERTS K<br>*DEVELOPMENTALLY REGULATED EPITOPES OF CELL-SURFACE ARABINOGALACTAN PROTEINS AND THEIR RELATION TO ROOT-TISSUE PATTERN-FORMATION* | 132 | 101 |
| 8 | 48 1989 JOURNAL OF CELL BIOLOGY 108(5):1967-1977<br>PENNELL RI; KNOX JP; SCOFIELD GN; SELVENDRAN RR; ROBERTS K<br>*A FAMILY OF ABUNDANT PLASMA-MEMBRANE ASSOCIATED GLYCOPROTEINS RELATED TO THE ARABINOGALACTAN PROTEINS IS UNIQUE TO FLOWERING PLANTS* | 108 | 82 |

Fig. 18

| Author(s) | GLEESON PA; JERMYN MA; CLARKE AE |
|---|---|
| Title | ISOLATION OF AN ARABINOGALACTAN PROTEIN BY LECTIN AFFINITY CHROMATOGRAPHY ON TRIDACNIN-SEPHAROSE-4B |
| Journal | ANALYTICAL BIOCHEMISTRY 92(1):41-45 |
| Year | 1979 |
| Type | Article |
| Address | CSIRO,DIV PROT CHEM,PARKVILLE 3052,VICTORIA,AUSTRALIA UNIV MELBOURNE,SCHBOT,PARKVILLE 3052,VICTORIA,AUSTRALIA |
| Abstract | |
| WoS CS | 14 |
| LCS | 4 |
| Cites | 2 |
| CR[26] | ALBERSHEIM P, 1967, CARBOHYD RES, V5, P340<br>ANDERSON RL, 1977, AUST J PLANT PHYSIOL, V4, P143<br>ANDREW IG, BIOCH J<br>ANDREW IG, 1977, P AUST BIOCHEM SOC, V10, P28<br>BALDO BA, 1975, ADV EXP MED BIOL, V64, P3<br>BALDO BA, 1977, AGP NEWS, P21<br>BALDO BA, 1978, AUST J BIOL SCI, V31, P149<br>BALDO BA, 1975, CARBOHY RES, V40, P143<br>BALDO BA, 1977, COMP BIOCH PHYSL A, V56, P343<br>BALDO BA, 1975, IMMUNOLOGY, V29, P1161<br>CLARKE AE, 1978, AUST J PLANT PHYSL, V5, P707<br>CLARKE AE, PHYTOCHEMISTRY<br>CLARKE AE, 1978, Q REV BIOL, V53, P3<br>DELMER DP, 1977, CELL WALL BIOCH RELA, P85<br>DUBOIS M, 1956, ANAL CHEM, V28, P350<br>EICHMANN K, 1976, IMMUNOCHEMISTRY, V13, P1<br>GLAUDEMANS CPJ, 1974, CARBOHYD RES, V40, P129<br>GLEESON PA, 1977, AGP NEWS, P30<br>GLEESON PA, 1977, AUST J PLAN PHYSL, V4, P25<br>GLEESON PA, 1978, P AUST BIOCH SOC, V11, P33<br>JERMYN MA, 1975, AUST J PLANT PHYSL, V2, P501<br>KNOX RB, 1976, P NATL ACAD SCI USA, V73, P2788<br>LAMPORT DTA, 1977, RECENT ADV PHYTOCHEM, V11, P79<br>POTTER M, 1972, METHOD ENZYMOL, V28, P388<br>STONE BA, 1977, AGP NEWS, P21<br>YARIV J, 1962, BIOCHEM J, V85, P383 |

Fig. 19

Ranked Author list.
Total: 738
Sorted by CS

| Name | TGCS | TLCS | CS |
|---|---|---|---|
| Clarke AE | 1330 | 801 | 29 |
| Bacic A | 501 | 389 | 23 |
| Knox JP | 555 | 403 | 19 |
| Nothnagel EA | 290 | 235 | 14 |
| Roberts K | 606 | 467 | 13 |
| Lord EM | 232 | 106 | 11 |
| Pellerin P | 84 | 44 | 11 |
| Kieliszewski MJ | 226 | 105 | 10 |
| Phillips GO | 101 | 50 | 10 |
| Tsumuraya Y | 110 | 70 | 10 |
| vanHolst GJ | 347 | 267 | 10 |
| Brillouet JM | 132 | 84 | 9 |
| Cheung AY | 154 | 69 | 9 |
| Hashimoto Y | 106 | 68 | 9 |
| Baldwin TC | 89 | 72 | 8 |
| FINCHER GB | 420 | 248 | 8 |
| Moutounet M | 100 | 41 | 8 |
| Pennell RI | 365 | 283 | 8 |
| Lamport DTA | 263 | 128 | 7 |
| Menzies AR | 64 | 36 | 7 |
| Showalter AM | 390 | 102 | 7 |
| Williams PA | 77 | 41 | 7 |
| Wu HM | 118 | 59 | 7 |
| Anderson MA | 118 | 85 | 6 |
| Leykam JF | 69 | 48 | 6 |
| Osman ME | 64 | 36 | 6 |
| Samaj J | 30 | 19 | 6 |
| AKIYAMA Y | 86 | 48 | 5 |
| Baluska F | 30 | 19 | 5 |
| Basile DV | 26 | 24 | 5 |
| deVries SC | 124 | 34 | 5 |
| GLEESON PA | 135 | 72 | 5 |
| Hahn MG | 128 | 39 | 5 |

Fig. 20

Clarke AE 0 1977 AUSTRALIAN JOURNAL OF PLANT PHYSIOLOGY 4(1):143-158
ANDERSON RL; CLARKE AE; JERMYN MA; KNOX RB; STONE BA
*CARBOHYDRATE-BINDING ARABINOGALACTAN-PROTEIN FROM LIQUID SUSPENSION CULTURES OF ENDOSPERM FROM LOLIUM-MULTIFLORUM*

1 1978 PROCEEDINGS OF THE AUSTRALIAN BIOCHEMICAL SOCIETY 11():33-33
GLEESON PA; CLARKE AE; JERMYN MA; KNOX RB
*ARABINOGALACTAN PROTEINS OF FEMALE REPRODUCTIVE TISSUES OF GLADIOLUS-GANDAVENSIS*

2 1979 ANALYTICAL BIOCHEMISTRY 92(1):41-45
GLEESON PA; JERMYN MA; CLARKE AE
*ISOLATION OF AN ARABINOGALACTAN PROTEIN BY LECTIN AFFINITY CHROMOTOGRPAPHY ON TRIDACNIN-SEPHAROSE-4B*

3 1979 BIOCHEMICAL JOURNAL 181(3):607-&
GLEESON PA; CLARKE AE
*STRUCTURAL STUDIES ON THE MAJOR COMPONENT OF GLADIOLUS STYLE MUCILAGE, AN ARABINOGALACTAN-PROTEIN*

5 1979 PHYTOCHEMISTRY 18(4):521-540
CLARKE AE; ANDERSON RL; STONE BA
*FORM AND FUNCTION OF ARABINOGALACTAN-PROTEINS*

7 1980 BIOCHEMICAL JOURNAL 191(2):437-447
GLEESON PA; CLARKE AE
*ANTIGENIC DETERMINANTS OF A PLANT PROTEOGLYCAN, THE GLADIOLUS STYLE ARABINOGALACTAN-PROTEIN*

16 1983 ANNUAL REVIEW OF PLANT PHYSIOLOGY AND PLANT MOLECULAR BIOLOGY 34():47-70
FINCHER GB; STONE BA; CLARKE AE
*ARABINOGALACTAN-PROTEINS – STRUCTURE, BIOSYNTHESIS, AND FUNCTION*

Fig. 21

Ranked Journal list.
Total: 116

| Title | Rank |
|---|---|
| PLANT PHYSIOLOGY | 34 |
| PLANTA | 30 |
| PLANT JOURNAL | 21 |
| PROTOPLASMA | 19 |
| PLANT CELL | 16 |
| PHYTOCHEMISTRY | 15 |
| CARBOHYDRATE RESEARCH | 14 |
| PLANT MOLECULAR BIOLOGY | 12 |
| SEXUAL PLANT REPRODUCTION | 11 |
| CARBOHYDRATE POLYMERS | 10 |
| PROCEEDINGS OF THE NATIONAL ACADEMY OF SCIENCES OF THE UNITED STATES OF AMERICA | 9 |
| AGRICULTURAL AND BIOLOGICAL CHEMISTRY | 7 |
| FOOD HYDROCOLLOIDS | 6 |
| JOURNAL OF AGRICULTURAL AND FOOD CHEMISTRY | 6 |
| PHYSIOLOGIA PLANTARUM | 6 |
| PLANT PHYSIOLOGY AND BIOCHEMISTRY | 6 |
| AMERICAN JOURNAL OF ENOLOGY AND VITICULTURE | 4 |
| ANALYTICAL BIOCHEMISTRY | 4 |
| TRENDS IN PLANT SCIENCE | 4 |
| PLANT SCIENCE | 4 |
| MOLECULAR BOTANY: SIGNALS AND THE ENVIRONMENT | 4 |
| ANNUAL REVIEW OF PLANT PHYSIOLOGY AND PLANT MOLECULAR BIOLOGY | 4 |

Fig. 22

Cited references outside of this network.
Total: 7823 (top 100 shown).

| LCS | Reference |
|---|---|
| 69 | YARIV J, 1962, BIOCHEM J, V85, P383 VI EG |
| 65 | KNOX JP, 1989, DEVELOPMENT, V106, P47 VI EG |
| 49 | DUBOIS M, 1956, ANAL CHEM, V28, P350 VI EG |
| 46 | JERMYN MA, 1975, AUST J PLANT PHYSL, V2, P501 VI EG |
| 43 | CARPITA NC, 1993, PLANT J, V3, P1 VI EG |
| 40 | LAEMMLI UK, 1970, NATURE, V227, P680 VI EG |
| 37 | CLARKE AE, 1978, AUST J PLANT PHYSL, V5, P707 VI EG |
| 36 | PENNELL RI, 1992, J CELL BIOL, V119, P1371 VI EG |
| 35 | KNOX JP, 1990, PLANTA, V181, P512 VI EG |
| 34 | BLUMENKRANTZ N, 1973, ANAL BIOCHEM, V54, P484 VI EG |
| 33 | SHOWALTER AM, 1989, BIOCH PLANTS, V15, P485 VI EG |
| 32 | LOWRY OH, 1951, J BIOL CHEM, V193, P265 VI EG |
| 30 | NORMAN PM, 1990, PLANTA, V181, P365 VI EG |
| 29 | LI YQ, 1992, PLANTA V188, P532 VI EG |
| 29 | ROBERTS K, 1990, CURR OPIN CELL BIOL, V2, P920 VI EG |
| 29 | SCHOPFER P, 1990, PLANTA V183, P139 VI EG |
| 27 | BRADFORD MM, 1976, ANAL BIOCHEM, V72, P248 VI EG |
| 25 | CHEUNG AY, 1993, PLANT J, V3, P151 VI EG |
| 25 | HAKOMORI S, 1964, J BIOCHEM-TOKYO, V55, P205 VI EG |
| 25 | ALBERSHEIM P, 1967, CARBOHYD RES, V5, P340 VI EG |
| 24 | WU HM, 1995 CELL, V82, P395 VI EG |
| 24 | YARIV J, 1967, BIOCHEM J, V105, PC1 VI EG |
| 23 | MORT AJ, 1977, ANAL BIOCHEM, V82, P289 VI EG |
| 22 | GOLDMAN MHD, 1992, PLANT CELL, V4, P1041 VI EG |
| 21 | HARRIS PJ, 1984, CARBOHYD RES, V127, P59 VI EG |
| 21 | TSUMURAYA Y, 1984, CARBOHYD RES, V134, P215 VI EG |
| 21 | DEVRIES SC, 1988, PLANTA, V176, P196 VI EG |
| 20 | VANAELST AC, 1992, PROTOPLASMA, V168, P14 VI EG |
| 20 | WANG H, 1993, PLANT CELL, V5, P1639 VI EG |
| 20 | POPE DG, 1977, PLANT PHYSIOL, V59, P894 VI EG |
| 20 | BASILE DV, 1993, MEMOIRS TORREY BOT C, V25, P63 VI EG |
| 20 | LAMPORT DTA, 1971, PLANT PHYSIOL, V48, P454 VI EG |
| 19 | HESLOPHARRISON J, 1987, INT REV CYTOL, V107, P1 VI EG |
| 18 | MASCARENHAS JP, 1993, PLANT CELL, V5, P1303 VI EG |
| 18 | VANHOLST GJ, 1984, PLANT PHYSIOL, V74, P247 VI EG |
| 18 | SMALLWOOD M, 1994, PLANT J, V5, P237 VI EG |

Fig. 23

Potentially missed citations...
57 nodes have citations that may potentially refer to other nodes.

15 1982 AUSTRALIAN JOURNAL OF PLANT PHYSIOLOGY 9(1):31-45
MASCARA T; FINCHER GB
*BIOSYNTHESIS OF ARABINOGALACTAN-PROTEIN IN LOLIUM-MULTIFLORUM (RYEGRASS) ENDOSPERM CELLS .2. INVITRO INCORPORATION OF GALACTOSYL RESIDUES FROM UDP-GALACTOSE INTO POLYMERIC PRODUCTS*
POLLARD PC, 1981, AUST J PLANT PHYSL, V8, P535 may refer to 8 POLLARD-PC-1981-V8-P121

16 1983 ANNUAL REVIEW OF PLANT PHYSIOLOGY AND PLANT MOLECULAR BIOLOGY 34():47-70
FINCHER GB; STONE BA; CLARKE AE
*ARABINOGALACTAN-PROTEINS - STRUCTURE, BIOSYNTHESIS, AND FUNCTION*
POLLARD PC, 1981, AUST J PLANT PHYSL, V8, P535 may refer to 8 POLLARD-PC-1981-V8-P121

18 1983 PLANT PHYSIOLOGY 72(3):754-758
COHEN PB; SCHIBECI A; FINCHER GB
*BIOSYNTHESIS OF ARABINOGALACTAN-PROTEIN IN LOLIUM-MULTIFLORUM (RYEGRASS) ENDOSPERM CELLS .3. SUBCELLULAR-DISTRIBUTION OF PROLYL HYDROXYLASE*
POLLARD PC, 1981, AUST J PLANT PHYSL, V8, P535 may refer to 8 POLLARD-PC-1981-V8-P121

52 1990 SOVIET PLANT PHYSIOLOGY 37(4):547-554
ANTONOVA GF; STASOVA VV
*LOCATION OF ARABINOGALACTAN PROTEINS IN XYLEM OF SIBERIAN LARCH*
ANTONOVA GF, 1988, BIOKHIMIYA, V53, P946 may refer to 41 ANTONOVA-GF-1988-V53-P818

69 1992 DEVELOPMENTAL BIOLOGY 153(1):16-28
LORD EM; SANDERS LC
*ROLES FOR THE EXTRACELLULAR-MATRIX IN PLANT DEVELOPMENT AND POLLINATION - A SPECIAL CASE OF CELL-MOVEMENT IN PLANTS*
KNOX JP, 1991, PLANT J, V1, P175 may refer to 62 KNOX-JP-1991-V1-P317

Fig. 24

PROCESS FOR CREATING AND DISPLAYING A PUBLICATION HISTORIOGRAPH

This application claim benefit of provisional No. 60,289,616 file in May 8, 2001.

FIELD OF THE INVENTION

The invention is related to the field of information science. It is particularly pertinent to the creation of historical maps of scientific and scholarly publications and, through such maps, to illustrate histories of the development of the theories, ideas, hypotheses and discoveries that advance science and scholarly pursuits in the interest of mankind.

BACKGROUND OF THE INVENTION

To those who practice the art and science of mapping the historical development of scientific and scholarly ideas, principles and discoveries, a most useful tool is the historical map of the evolutionary history of a singular thread of insight expressed in a publication. By mapping the citation history of an article forward and back, it is possible to discover the primordial (that is, the original) expression of the theory or concept and trace its development over time in succeeding papers on that subject and others closely related to it. These maps are called historiographs (or historiograms). Historiographs aid the study of the contemporary history of scientific topics. History and bibliography are intimately linked.

There have been many different types of "mapping" exercises performed on a small scale particularly with respect to clustered files of bibliographic information. The clustering required main frame computers. These ideas were later extended to creating small cluster maps in the SciMap system developed by Henry Small at the Institute for Scientific Information (ISI). In that mainframe system a starting paper is used to seed the creation of a cluster map.

In spite of the many mapping and visualization techniques available, none of them were applicable to the creation of historiographs. Indeed, no one considered the relationship between historical display and its use in the evaluation of large data sets retrieved from publicly accessible databases like Science Citation Index (SCI), Medline, PubSci, to name a few. Government and privately maintained databases can also serve as sources for historiographic analysis (Examples: U.S. Patent and Trademark Office patents database, the American Chemical Society publication database).

Even in the early stages of developing the idea of programmed algorithmic historiography, it was considered only in terms of seeding the process by selecting one or more primordial papers. Then the Science Citation Index (SCI) would be used to trace forward in time all the papers that had cited the starting reference. This is the fundamental notion involved in doing a traditional cited reference search.

Indeed, since the idea of creating an historiograph is to display the chronological development of science from the primordial paper forward, it was assumed that searching would be done one year at a time. This was also influenced by the fact that published indexes appear annually both in print and on CD-ROM. In contrast, literature searches are traditionally focused on retrieving the most current material and then working backward. Using the annual CD-ROM version of the SCI, the inventors' initial experiments involved a cited reference search on a single starting paper; all papers that cited it in that one year file were retrieved. Then a further search was done on those citing papers. Then the search process was iterated for as many years of the literature necessary.

However, it became apparent that one would and could feed in a group of papers by an author and then by extension larger groups of papers by institution or by key word. Thus the output of any conventional search can be input to the system so as to produce its map and identify the core papers.

The production of the various tables or lists from these procedures is of course separate from the problem of visualizing these data in the form of maps or graphs. These artifacts aid in the visual perception of the interrelationships between citing and cited papers. Creating maps of related documents present problems in display due to the limitations of space and restrictions of an 8×11 piece of paper. Visualization is aided by using larger sheets, such as tabloid size of 12×15. However, the advent of computer display screens means that one can create a display page of infinite size. Segments of a map can be shown in a movable display. Using mouse clicks and pop-up windows one can first show a condensed version of a large map in which the main nodes are visible but intermediate nodes are not.

Thus a map of several hundred nodal papers would first be seen in a condensed version in which only 25 to 50 nodes are seen, perhaps the most cited papers in the collection. The full map could be observed in chronological sections from top to bottom or from left to right. Essentially one goes from a standard two-dimensional display to a moving interactive multi-dimensional display. The combination of computer with human selection permits the algorithmic real time visualization of the historical connections between literatures on a micro or macro level.

SUMMARY OF THE INVENTION

The invention is a process, adaptable to implementation in software and operation in a computer system having a visual display device, which analyzes a large collection of related publications and organizes the documents into an historiograph of the subject matter. The invention process starts with a randomly organized file of input documents or their descriptions. Then an output database is created which permits one to identify a series of most significant nodes and links in tables and graphs. Thus the user can quickly perceive the historical connections between the documents. The system may include classification tags or research front identifiers that would permit one to recognize the larger cluster or category of which each paper is a part.

While the described embodiment of the invention processes source documents containing citation index tags, entire texts of documents could also be included. In that way it would be possible to observe the contextual significance of each citation.

In a first embodiment, the invention produces five basic indexes based on author, institution, journal, year, and citation frequency. Other tables may be added, such as tables based on title words or key words so as to identify the most often used terminology in the subject.

The system also produces frequency-ranked indexes of cited papers that fall outside the basic core collection. The user can examine these candidate papers and decide whether to include them in the core analysis. For example, a highly cited book or patent might occur which is not part of the original source database and therefore a source record would have to be created. Some of these items may in fact have been published prior to the starting reference.

It is well known that authors cite references with many variant spellings or make errors in one or more parts of the reference such as volume or page. Such errors can cause an important paper to be missed in the process of accumulating related papers. These "missing" references are identified in a separate table in the process of the invention. As part of the procedures invoked, the process seeks out the closest matched document in the collection and suggests candidates that the reader is asked to examine. This can be done manually or by an expert system which, for example, adds a missing volume number to a citation that is otherwise identical for author, journal, year and page. In a large number of references the page cited will not be the first page, as in a typical chemical paper where a chemical compound is mentioned. If the citation frequency is high enough the user may wish to treat such a citation separately or include it as a subset of the fully paginated reference.

DESCRIPTION OF THE DRAWINGS

For the purpose of illustrating the invention, wherein like reference numerals indicate like elements, there is shown in the drawings a form which is presently preferred; it being understood, however, that this invention is not limited to the precise arrangements and instrumentalities shown.

FIG. 1 is a tabular representation of a part of an historiograph produced by the process of the invention.

FIG. 9 is an example of the node detail display in the historiograph produced by a first embodiment of the present invention.

FIG. 10 is a tabular representation of the Ranked Authors List display that is a product of the historiograph analysis of a first embodiment of the present invention.

FIG. 11 is a tabular representation of the Ranked Journals List display that is a product of the historiograph analysis of a first embodiment of the present invention.

FIG. 12 is an example of the Outer Nodes List display that is a product of the historiograph analysis of a first embodiment of the present invention.

FIG. 13 is an example of the Suspect Links list display that is a product of the historiograph analysis of a first embodiment of the present invention.

FIG. 14 is an example Nodes/Authors list display produced by an alternative embodiment of the process of the invention.

FIG. 15 is an example of the information displayed by selecting the link "2" under the "Cited Nodes" column of FIG. 14, node 2 (Gleeson et al.).

FIG. 16 is an example of the information displayed by selecting the link "4" under the "LCS" column of FIG. 14, node 2 (Gleeson et al.).

FIG. 17 is an example of the information displayed by selecting the link "LCS" in the column headings of FIG. 14.

FIG. 18 is an example of the information displayed by selecting the link "GCS" in the column headings of FIG. 14.

FIG. 19 is an example of the information displayed by selecting the link "2", indicating node 2 in FIG. 14.

FIG. 20 is an example of a Ranked Authors List produced by an alternative embodiment of the invention process that produced the analysis of FIG. 14.

FIG. 21 is an example of the information displayed by selecting the link "29" under the column heading "CS" in FIG. 20.

FIG. 22 is an example of a Ranked Author List for the historiograph of FIG. 14.

FIG. 23 is an example of list of cited references outside the nodes of the historiograph of FIG. 14.

FIG. 24 is an example of a list of potentially missed citations for the historiograph of FIG. 14.

DETAILED DESCRIPTION OF THE INVENTION

Figure 2:
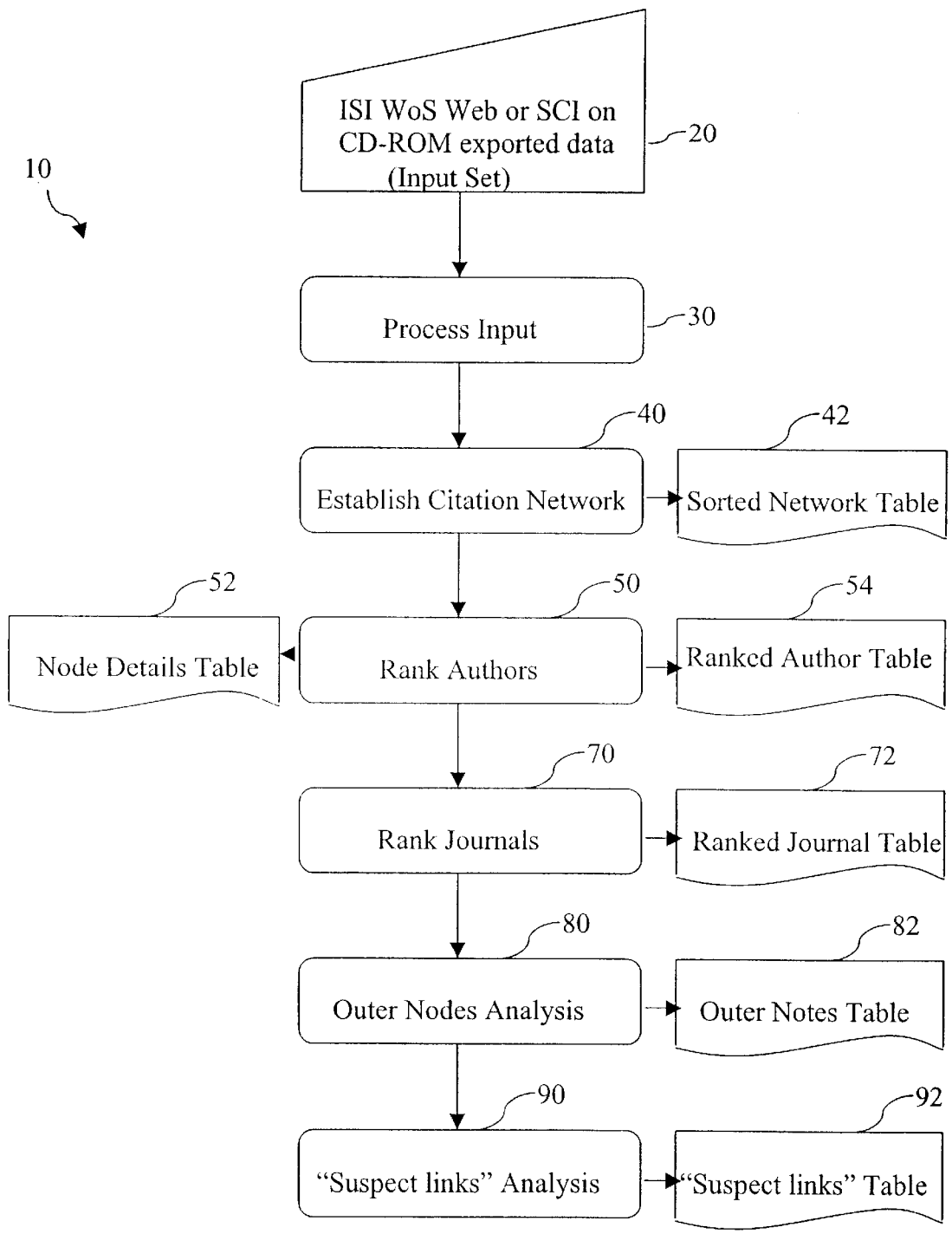
FIG. 2 is a diagram of the major steps in the process of the invention.

The invention is a process that operates to create both an historiograph, an organized and indexed database of collected citations and cross-citations among a number of publications, and a graphical display of the results of the analysis. The graphical display is formatted to make it clear to the user which publications were the most influential and which publication may be considered to be the "primordial" paper on a chosen subject. The most cited papers in the database likely contain the most meaningful expression of the subject matter, or perhaps add new insight to, or understanding or empirical confirmation of, earlier-expressed ideas. The earliest publication in the database is the primordial paper; that is, the earliest paper is usually the one that expressed for the first time the common thread of scientific or scholarly thought common to all of the listed papers. References to a "paper" in this description are generic to any kind of publication, including books, recorded presentations, essays, and expressions in any medium that permits storage and reproduction of its contents.

Before describing how the process operates, it is best to describe the graphical output of the process so that the steps that comprise the process itself can be more readily comprehended. Referring to FIG. 1, there is shown a tabular representation of part of an historiograph of a collection of publications related by citation history. This graphical display produced by the process of the invention is not the only format in which the results can be displayed. It is an example of how the product of the analysis can be presented in an efficient and readily comprehensible manner.

In FIG. 1, there are three columns of statistical and identifying information: "Cites"; "Nodes"; and "Cited." The "Node" column (or field) identifies each paper in the analysis. Each node is assigned a numerical index from 0 to N in an N paper historiograph, the index number appearing to the left of the author's name in the Node column of FIG. 1. The "Ryman" paper in FIG. 1 is indexed as node "0." It is followed by node 1, the Reuterwall paper. The node index numbers are assigned to the papers in the chronological order of their publication. The remaining information in the Node field is limited bibliographic information about the publication: author, publication date (year), volume and page.

The "Cites" field contains two items of information: the number of times the paper at that node of the historiograph cited others within the historiograph [shown in brackets]; and, the node identifier of the papers (shown in parentheses) that were cited by the paper at the node of interest. For example, the primordial (node 0) Ryman publication contains no cites to other papers in the historiograph. By comparison, the Scribner paper at node 20 in FIG. 1 cites two [2] other papers (7 13) listed at nodes 7 and 13.

That information leads to the "Cited" field, where the node numbers of papers citing the paper at any particular node are listed (in parentheses) along with the total number of citations [in brackets] to that node. Following the trail of the node 20 Scribner paper in FIG. 1, which lists cites to papers at nodes 7 and 13, reference to the node 7 Chesser paper shows a citation by the node 20 (Scribner) paper. And reference to the node 13 Chesser paper also shows a citation by the node 20 paper. Thus, one element of information that can be gleaned from the FIG. 1 historiograph is that the node 7 Chesser paper and the node 13 Chesser paper were both cited in the node 20 Scribner publication. A second fact is that these were the only two nodal papers in this historiograph that were cited by the paper at node 20 (Scribner).

It can also be readily seen that the Chesser paper at node 7 was cited in five [5] other publications. The node numbers of the papers citing the node 7 Chesser paper are shown in parentheses (20 30 116 212 310). Note that FIG. 1 shows only the first 23 nodes of the historiograph, which actually contained 360 nodes in its complete form. Far more information than that discussed so far can be derived from the historiograph produced by the process described herein. Examples are presented below.

The Analytical Process

The process of the invention is illustrated in FIGS. 2–8 and is described herein in an embodiment presently preferred, though other forms of the invention may be created. Referring to FIG. 2 there are illustrated the major steps in the process 10 for creating an historiograph and performing related information analyses, all of which are displayed in easily comprehended formats.

Beginning with an information source 20, the process 10 operates upon user identification of either a singular publication or a group of publications for which the user desires to create a citation historiograph. It is not necessary for the input publication(s) to be either the earliest or latest in a field of endeavor. The information source 20 may be the SCI, the Institute for Scientific Information Web of Science, or other citation index. The process requires that the user identify the range of years for which the analysis should be run and an historiograph produced.

Once the source paper(s) is(are) identified and the range of years for analysis set, the first analytical step is to process input 30 into the analysis from the source database 20 of citation index data. The process input step 30 causes the citation index database 20 to be searched for all of the papers that are cited in the source paper(s). The bibliographies of these papers are placed in a database, which will grow as the analysis proceeds. The citations that appear in these papers add more papers to the list of papers whose citation history must be run through the historiograph analysis. The analysis database that is created as input data is processed is called the "internal set" for the remainder of this description. Each of the papers placed in the internal set represents a potential "node" in the historiograph.

Then, for each of the years of citation index data that the user selected for analysis, the process input step 30 accesses the citation database 20 and collects all papers cited by the papers already stored in the analysis database. Process input step 30 further collects all papers cited in each of the newly collected papers and adds the citations in each of these papers to those that must be traced in the historical data. And, finally, the process input step 30 collects all papers that contain citations to any of the papers already collected in the internal set. Because this step collects citations to new papers in each search through a new year in the citation database 20, the Process Input step 30 must be iterated several times until a complete cross-reference of all cited and citing papers is assembled for the years under study and placed in the internal set. Process Input step 30 is complete when a pass through all of the years selected for analysis yields no more papers to be added to the internal set.

By way of example, for each year of the literature searched there could be 0 to N papers retrieved. Assuming that the SCI provides the source citation data, the full SCI source record for each of the N papers would be captured, including not only authors, titles, journal, volume page and year, but also their lists of cited references. If we assume that there are 20 cited references per source paper, then there would be 20N cited references collected. The purpose of these multigenerational searches is to build up a file of relevant source documents together with a much larger file of cited references. Thus, if the collection builds up to 500 source papers, the list of cited references would be about 10,000.

Still referring to FIG. 2, the process 10 of the invention proceeds to establish a citation network 40. In this step the process relates the cited to the citing papers throughout the internal set so that each paper may be identified in the historiograph with the number and identity of the papers that cite it, and the number and identity of the papers that it cites. Node numbers are assigned to each paper meeting the criteria for designation as nodes, which is a key to presenting the complex analysis results in a simple graphical form for display. The cross-reference of which papers (nodes) are cited by which other papers (nodes) is created and a nodal network table 42 is created. An example of this table is the tabular display shown in FIG. 1.

A brief example of the creation of historiograph data illustrates the process. The process is invoked to trace the history of the following paper:

Paper: A Cites: a, b, c, d
  Cited by: B

This paper A contains citations to papers a, b, c and d, and is cited by paper B. It is assumed for the purpose of this example that papers a, b, c and d were published in that chronological order. The process input step 30 searches the source data for several years to locate papers a, b, c, and d, and paper B. The step assembles a list of papers that cite and are cited by any of the four papers cited by A, and paper B that cites A. To illustrate with a simple result, the search locates the following citation information:

TABLE 1

| Paper: a | Cites: none |
| Paper: b | Cites: a, e, f |
| Paper: c | Cites: a, b, h, j |
| Paper: d | Cites: a, c, m |
| Paper: B | Cites: A, a, c, p |

It can be seen that the b, c and d papers contain citations to other papers in the search results. Thus, papers b, c and d are identified as nodes in the historiograph. Paper A is a node too because it cites four other nodal papers in the results. Paper a is a node also because, in this simple example, it appears to be the primordial paper (contains no cites to other papers in the historiograph but is cited by-others in the results). Paper B has also been determined to cite not only paper A, but also node papers a and c. The historiograph results for this example, produced in a format like FIG. 1, would appear as shown in Table 2:

TABLE 2

| Cites | Nodes | Cited |
| --- | --- | --- |
| ( ) | (0) a (identity of paper) | (1 2 3 4 5) [5] |
| (0) [1] | (1) b | (2 4) [2] |
| (0 1) [2] | (2) c | (3 4 5) [3] |
| (0 3) [2] | (3) d | (4) [1] |
| (0 1 2 3) [4] | (4) A | (5) [1] |
| (0 2 4) [3] | (5) B | ( ) |

A paper is designated as a node in the analysis if it contains a citation to any other paper that is a node. The "seed" paper or papers are designated as nodes in the analysis because they contain citations to other papers in the result (they must because the process searched the source data for papers cited by the seed paper(s) as well as papers that cite to them). The earliest cited paper in the result (paper a) is designated as node 0. Papers b, c and d, published in that order, are nodes 1, 2 and 3. Papers A and B are nodes 4 and 5.

The result for the simple example given in Table 1, and analyzed in Table 2, shows that the node 0 paper a (the primordial node) cites no other papers and is itself cited in five others that appear as nodes in the historiograph. The node 2 paper c cites two other nodes (0 and 1), and is itself cited in three other papers, those listed at nodes 3, 4 and 5. The node 5 paper B cites three node papers in the result but is not cited by any others. Note that other papers (e, f, h, j, m, p) listed in the citations list of the paper citations (Table 1) are not included in the historiograph output, Table 2. That is because, though they are cited by papers that are designated as nodes of the historiograph, they do not themselves contain citations to any node paper in the result. These papers are collected in a step of the process that identifies highly cited papers outside the historiograph.

Referring back to FIG. 2, the process 10 proceeds to a step 50 to rank the authors that appear in the historiograph. The records in the internal set are processed by node and the names of the authors of the paper at each node are extracted and listed in a new dataset (the author set). For any paper with multiple authors, all authors are listed separately in a table along with the corresponding node(s) (papers) with which they are associated. The data in the author set is used to generate a Ranked Author Table 54 (FIG. 10) for display to the user, ranking the authors according to the number of papers on which each is named as author or co-author. Another table containing the identification of each paper corresponding to a node in the analysis, called the Node Details Table 52, is created. This table, an example of which is shown in FIG. 9, is explained below.

The process proceeds to a step 70 that ranks the journals in which the articles in the historiograph appear. The step 70 accesses the internal set by node and extracts the name of the journal in which the paper at that node was published. The name of each journal is stored in a journal dataset, ranking the journals by the number of papers appearing in the historiograph that were published in each journal. This dataset is then used to generate a Ranked Journal Table 72 (FIG. 11) for display to the user. In the example output format shown in FIG. 11, the journals are listed by title from the most cited journal to the least cited. Under the heading "nodes" appear the nodal identifiers of the articles that appeared in that journal (in parentheses) and the total number of times that the journal appears in the nodes of the historiograph (in brackets). In FIG. 11, papers published in the journal Evolution appear 18 times in the historiograph at the indicated nodes.

The papers that appear in the historiograph will typically contain citations to other papers that did not meet the criteria for inclusion as nodes in the historiograph (that is, they do not cite any other node, nor are they cited by any other node). In another step 80 of the process, highly cited works that are not within the historiograph are identified out of the internal set and listed. An Outer Nodes Table 82 (FIG. 12) is produced for display. This table is of considerable significance to the researcher. It can identify a very highly regarded author in the field, or a paper that contains important information that supplements, or was the basis for, ideas expressed in the papers in the historiograph. This outer node list is the informational universe, so to speak, within which the nodes of the historiograph orbit and is extremely valuable to the information historian.

To identify any data that contains suspect information, the process includes a step 90 to identify suspect links in the historiograph. This step searches the internal set of data to locate papers that may have errors in the citation information. During this analyis, questionable citations may be linked to the nodes of the historiograph, but they are simultaneously placed in another dataset of suspect link information. This dataset is used to create a table 92 of suspect links, such as those in FIG. 13, among the nodes of the historiograph to alert the user to the potential for error at that node. It also alerts the user to the potential that a paper not appearing in the historiograph actually should be included for accuracy.

The Historiograph Output

The historiograph output can be printed and reviewed in hard copy. However, when viewed on a computer screen, the historiograph comprises an indexed list in HTML format of all of the nodes identified in the analysis (FIG. 1) in a tabular display that can be linked to the other HTML tables produced by the process 10 of the invention. The nodes numbers identified under the "Cites" and "Cited" columns of the FIG. 1 tabular display are hot-linked to the identifying node detail information in the Node Details Table 52. The historiograph process collects and displays several metrics about each node, and about the analysis as a whole, including the number of citations to that node by other nodes, the number of citations to other nodes that a node contains, the number of times an author is cited in all of the nodes, the number of times a particular journal appears in the nodes of the analysis, and so on. Examples are given below.

Thus, referring to FIG. 1, when viewing the tabular historiograph on a computer screen, the user may examine node 0 (the Ryman paper) and want to quickly identify one of the citing papers, for example, node 12 (under the "Cited" column). A click on the "12" link in the "cited" list jumps the user to the HTML screen shown in FIG. 9. This display identifies the author, title, journal (by title, volume, page), year of publication, type of paper, number of cited references, and the "Cited" and "Cites" information that appears in the historiograph at node 12. Referring to FIG. 1 again, the paper at node 20 lists cites to two [2] other papers in the historiograph (nodes 7 and 13). The user may click on these node numbers in the "Cites" column and quickly see the complete identification of the papers at those nodes. And, of course, a click on the node number of any paper under the "Node" column displays the complete identification of that node's paper too.

Referring again to FIG. 1, the historiograph tabular display also has links to the data tables that were assembled by the process 10. At the top of the display in FIG. 1 appear links to "Outer nodes?", "Missing links?", "Journal List", and "Author List." Clicking on each of these links displays a popup list for the user.

FIG. 10 is an example of the list of authors contained in the Ranked Author Table 54 created in the main process 10. The table in FIG. 10 shows that in this particular historiograph, DE Wildt was an author or co-author in twelve of the papers represented in the nodes of the analysis. It can be seen that N Ryman, the author of what appears at node 0 as the primordial paper in this analysis, is an author or co-author of nine papers appearing in the historiograph. The nodes that correspond to each of these papers are identified in the Ranked Author list of FIG. 10. Again, each of the nodes in the author list are hot-linked to the dataset that displays the identity of each paper (as in FIG. 9).

FIG. 11 is an example of the list of journals that comprise the Ranked Journal table 72 created in the process 10. This table can be seen by clicking on the "Journal List" link in FIG. 1. The journals are listed in descending order of the frequency of their appearance in the historiograph analysis. In FIG. 11, the journal Evolution appears eighteen times in the historiograph at the nodes identified under the "Nodes" column in FIG. 11. Note that the primordial paper (Node 0—Ryman) appeared in this publication, though that would not necessarily occur in all such studies.

Clicking the "Outer nodes" link on FIG. 1 causes the list shown in FIG. 12 to pop up on the display. This is the Outer Nodes Table 82 created during the main process 10. It is a list of highly cited works that did not meet the criteria for inclusion as cross-cited nodes in the historiograph. They simply appear frequently as cited references in the papers that comprise the nodes that are included in the historiograph and are significant for that fact. Referring to the first entry in FIG. 12, it can be seen that the Sneath 1973 paper was cited 54 times in the papers that comprise the nodes of the historiograph. The remaining papers are listed in descending frequency of their citation in the papers comprising the historiograph nodes.

Referring to FIG. 13, a click on "Missing Links" on the tabular display of FIG. 1 causes a list of potentially missed citations, the "Suspect Links" table 92 created in the main process 10, to be displayed. This table can contain partial identification of certain citations that may or may not be correct because the citation information in the source index 20 (FIG. 1) was incomplete or erroneous. In FIG. 13, the node 0 Ryman paper may have been cited in five other papers that are partially identified in the suspect links list. Some of the suspect citation information may be sufficiently accurate to permit the process to suggest to the user that the suspect citation may actually be one of the nodes already in the historiograph. For example, referring to FIG. 13, the node 35 O'Brien paper has a citation to "OBRIEN-SJ-1983 SCIENCE-V221-P460" which may actually be the same paper as the O'Brien paper at node 16 in the historiograph (the only difference being in the page number of the citation). This information gives the user the opportunity to check the citation information and perhaps identify papers that should be part of an accurate historiograph but were excluded because the digitized data was inaccurate or erroneous.

The Subprocesses of the Invention

Having described the output of the analysis, the individual subprocesses that comprise the main process 10 shown in FIG. 1 are now described with reference to FIGS. 3–8.

Figure 3:
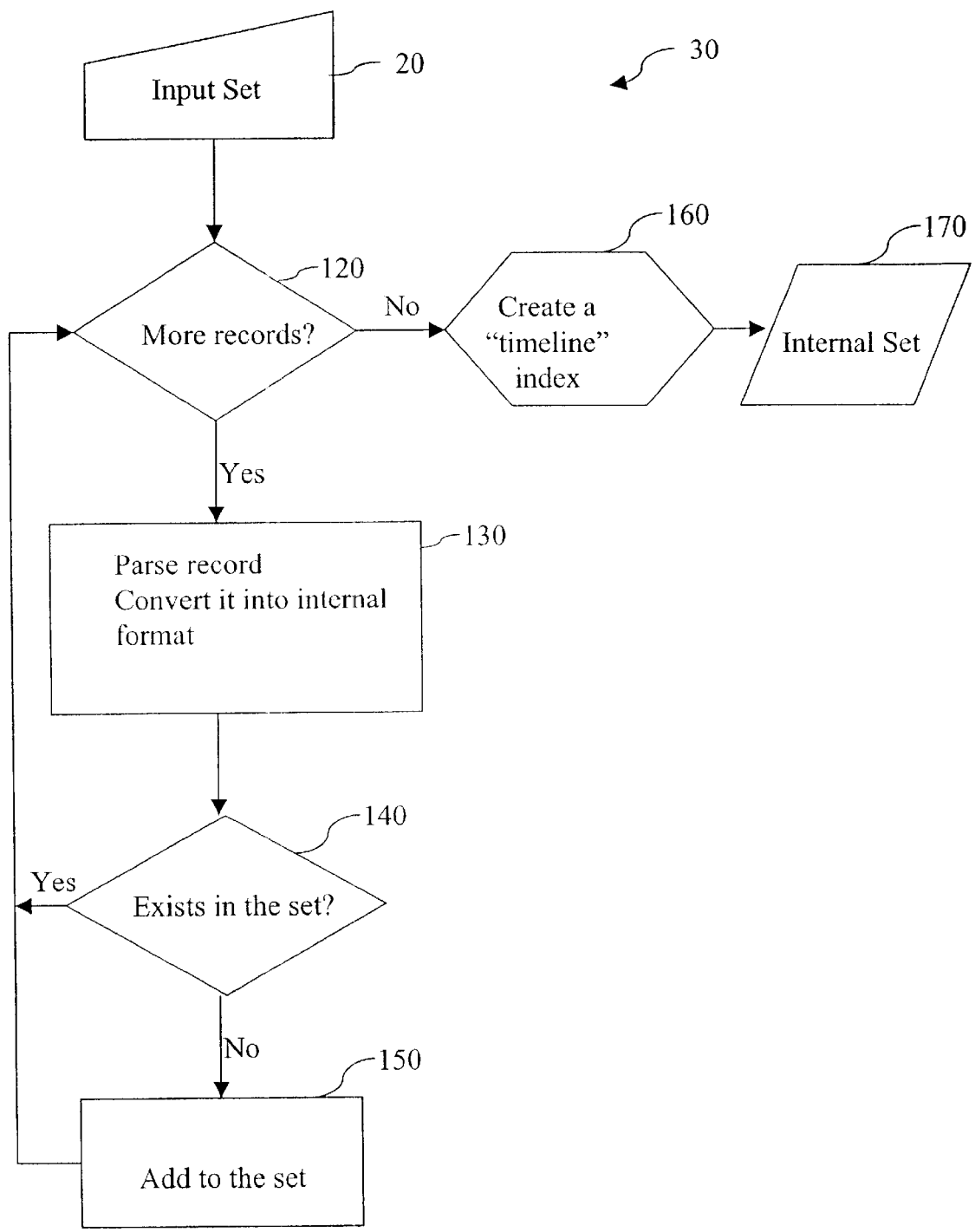
FIG. 3 is a diagram of the Process Input subprocess of the invention.

The historiograph process 10 begins with the Process Input step 30. Referring to FIG. 3, this subprocess accesses the source data in the input set 20 (a database of citation index information) based on the "seed" paper or papers for which the historical information is desired. A conventional search algorithm determines whether there are more records 120 in the input set 20 for inclusion in the internal set 170 of papers that are subject to inclusion in the historiograph. If a new record is discovered, it is parsed and converted 130 into the standard format for analysis in the historiograph process. As the records in FIG. 9 show, the information includes the author name, paper title, journal, volume, page, year of publication, type of paper (e.g., dissertation, article, patent, etc.). Once formatted for analysis, the record is compared 140 to the contents of the internal set 170 to determine if it is already included in the analysis database. If not, it is added 150 to the internal set 170. If it is already there, it can be discarded. Then the subprocess is repeated until all papers have been located that cite or are cited by papers in the internal set for the range of years that the analysis is being conducted. Once the internal set is complete (the search is finished), all of the citation records are indexed in a timeline 160 as a first organizational step in the analysis. At the completion of the Process Input step 30, the internal set 170 is ready for analysis.

Figure 4:
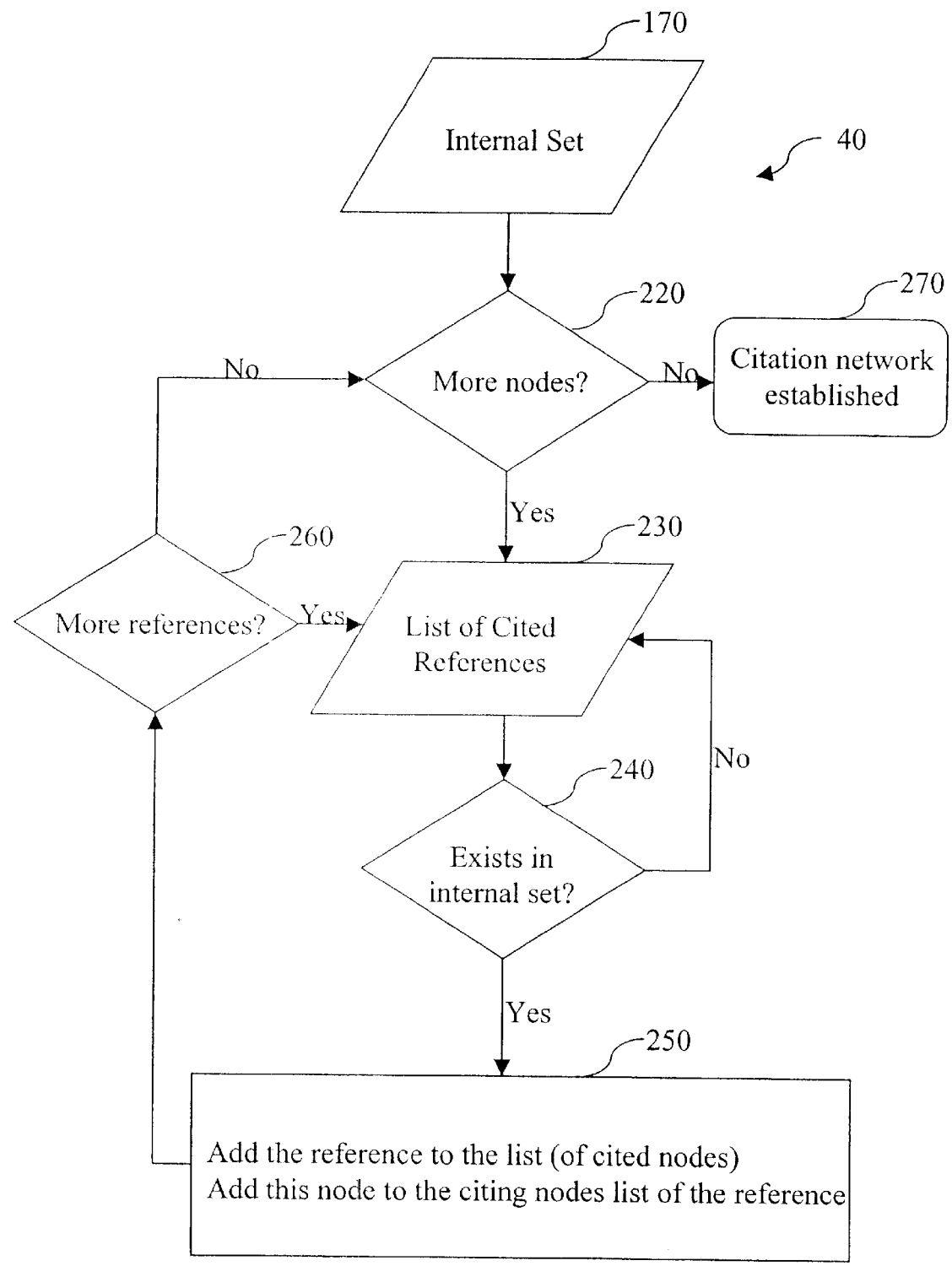
FIG. 4 is a diagram of the Establish Citation Index subprocess of the invention.

The Establish Citation Network step 40 of the process 10 in FIG. 1 is illustrated in FIG. 4. Operating on the internal set 170 data, this subprocess performs a node-by-node cross-linking of the paper citations in the internal set. As long as there is another node to process 220, the subprocess examines the list of cited references 230 in each paper citation record in the internal set 170. It determines 240 whether the cited reference appears in the internal set 170. If so, in the next step 250 the reference is (i) added to the list of nodes that become part of the historiograph and (ii) added to the "citing" nodes list of references in the historiograph. If more references 260 are contained in the record being examined, the remaining references are analyzed for inclusion as nodes in the historiograph. If no more citations are available in an internal set record 260, then the subprocess continues 220 with the analysis of more nodes in the internal set 170 until they are all analyzed.

Once all of the node records are analyzed to add the citation information to the analysis, the citation network of cited and citing references is completed 270. The result of this step is the tabular information shown in the sorted network table 42 (FIG. 2) display shown in FIG. 1 as one output product of the main process.

Figure 5:
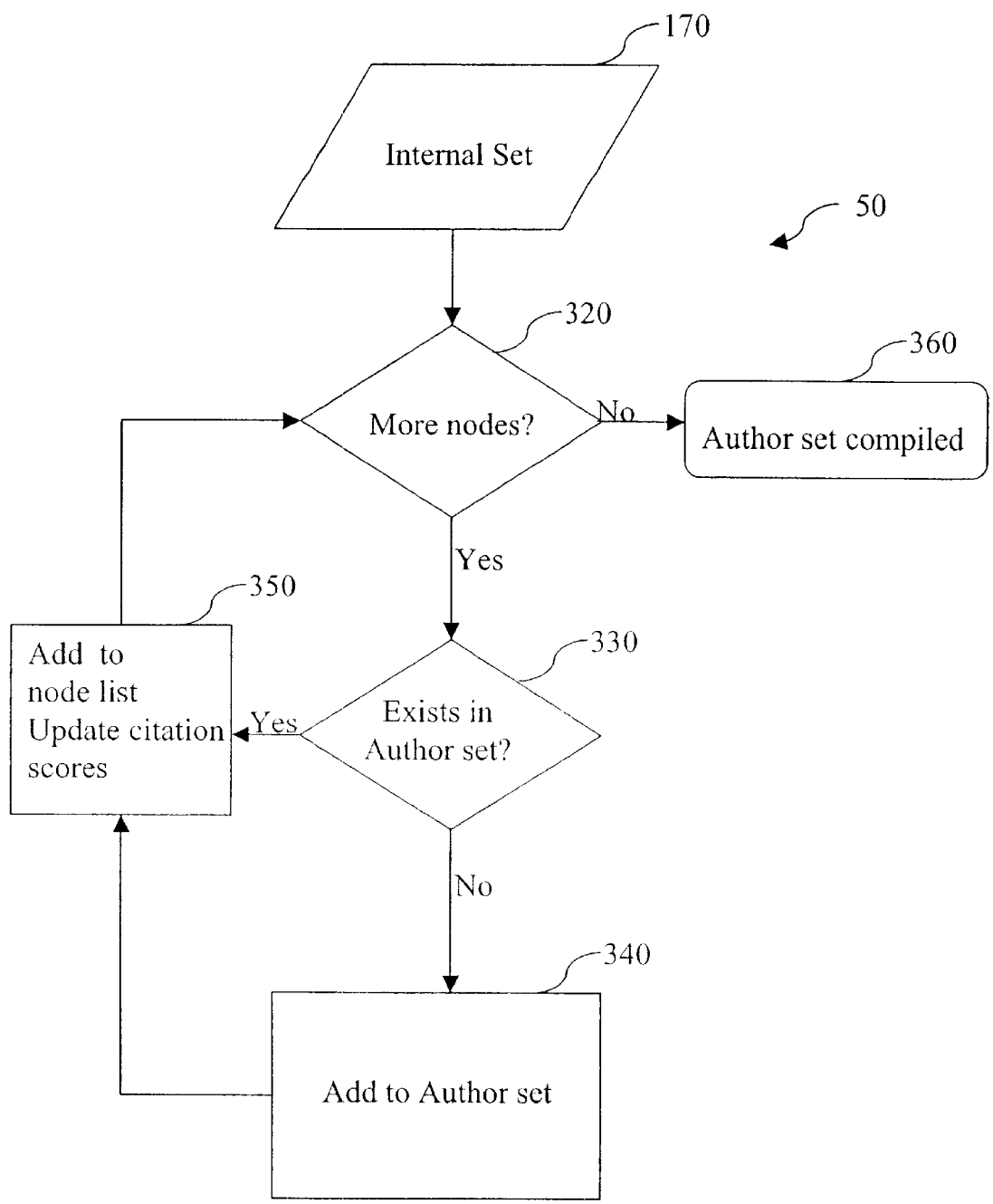
FIG. 5 is a diagram of the Rank Authors subprocess of the invention.

The authors are ranked by frequency of appearance, and the Ranked Authors Table compiled, in the Rank Authors 50 (FIG. 2) subprocess shown in FIG. 5. Once again operating on the records, in the internal set 170, this process is a node-by-node analysis of the authors that are named in the papers. After accessing a node 320 from the internal set 170, the subprocess determines 330 if the name of the author exists in an "author set" data collection yet. If not, the author is added 340. Once added, or after a determination 330 that the author is already included, the node is added 350 to the node list assigned to that author's name and the citation score figure (the number showing how many nodes list this author) is updated. Once all of the nodes are processed 320, a final author set is compiled 360 to permit display of the Ranked Author Table 54 shown in FIG. 10.

Figure 6:
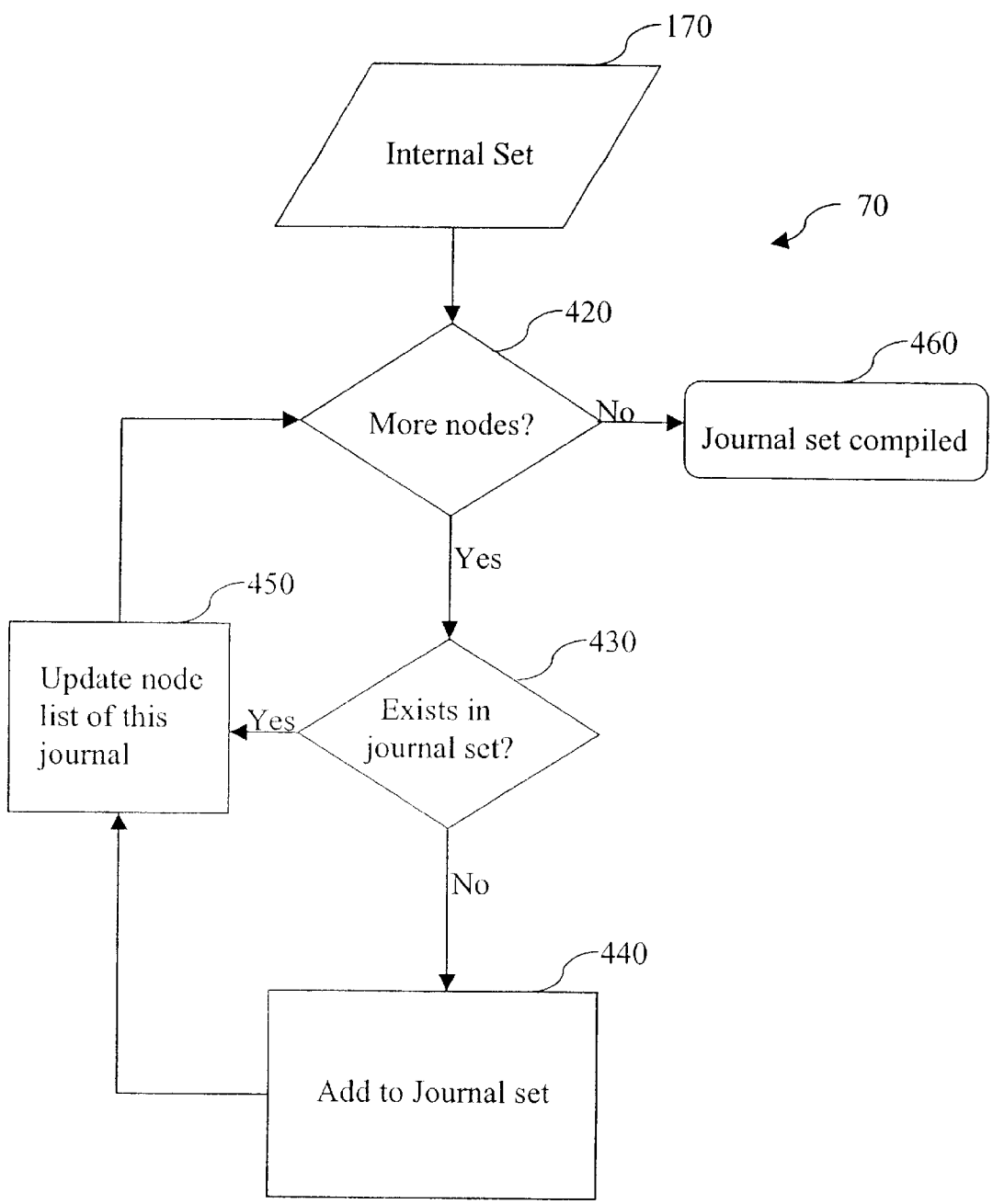
FIG. 6 is a diagram of the Rank Journals subprocess of the invention.

Referring to FIG. 6, a similar subprocess 70 compiles the ranked list of journals appearing in the historiograph. The Rank Journals 70 (FIG. 1) subprocess also operates on the internal set 170 of nodes in the historiograph. For each node 420, a determination is made 430 whether the journal listed in that node has been included in the list of journals in the analysis. If not, the journal is added 440 to the list. Once added, or after a determination 430 that it is already included, the node list that shows which nodes of the historiograph represent this journal is updated 450. Once all the nodes have been processed 420, a final journal set is compiled 460 to permit display of the Ranked Journal Table 72 shown in FIG. 11.

Figure 7:
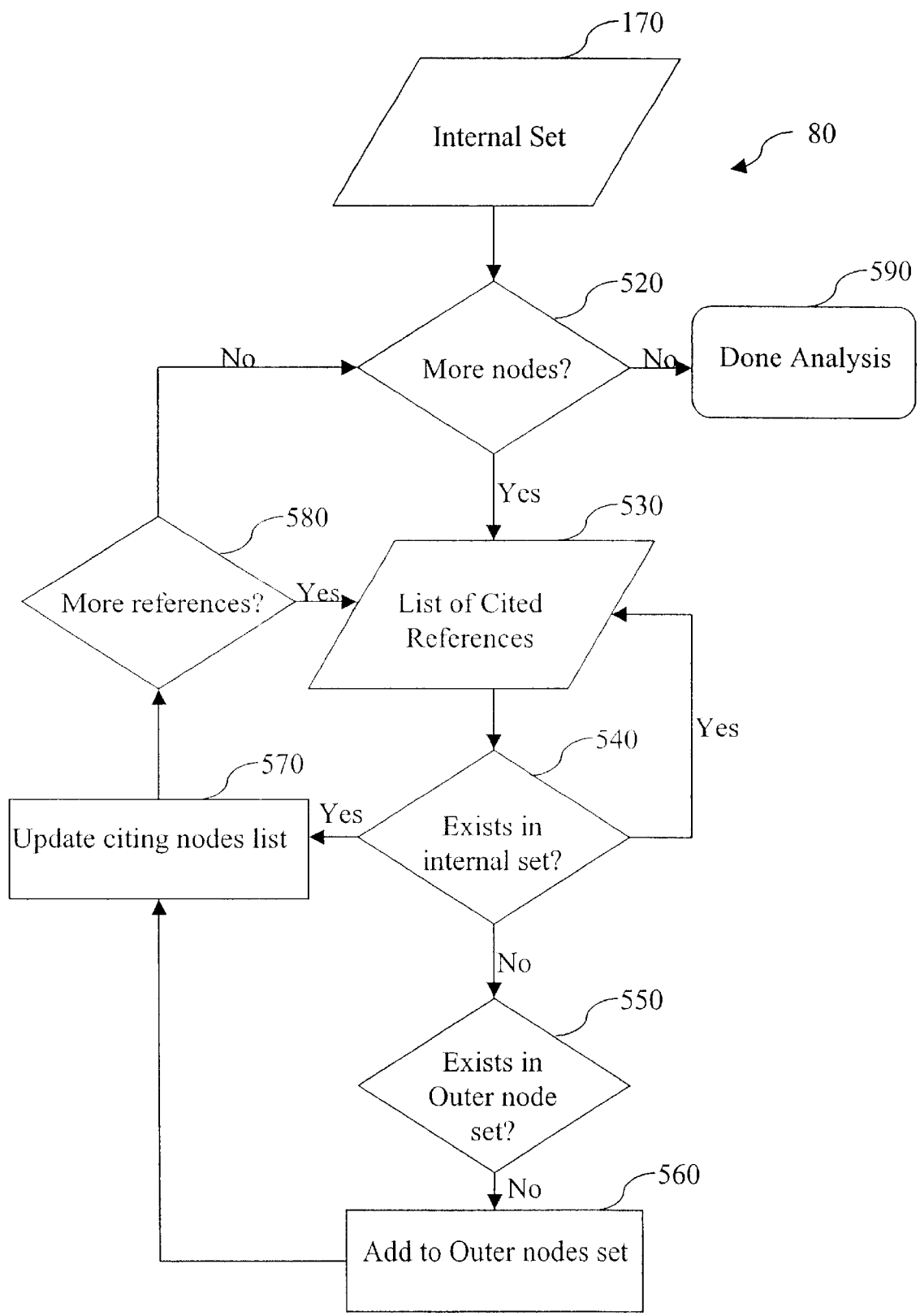
FIG. 7 is a diagram of the Outer Nodes Analysis subprocess of the invention.

The Outer Nodes Table 82 of the main process 10 is a product of the Outer Nodes Analysis 80 subprocess shown in FIG. 7. Using the internal set 170 as input, this subprocess 80 operates on each node and collects all of the citations in each paper, whether the citation appears in the historiograph result or not. For each node 520, the subprocess examines each of the cited references 530 in the paper of that node. A determination is made 540 whether the citation is to a paper in the internal set; that is, whether the citation is to a paper in the historiograph network. If so, it need not be included in the "outer nodes" because it has already been included in the historiograph network table 42 produced by the main process Establish Citation Network step 40. So the subprocess simply returns to the references for the node 530 and checks the next one 540. If a citation reference is not a member of the internal set, then a determination is made 550 whether it has already been placed in the outer nodes set. If not, it is added 560. If so, the list of nodes citing that reference is updated 570 and the subprocess continues for the next citation reference 580. If none are left for the node being analyzed, then the next node is accessed 520 until they are all processed. At that point, the process is complete 590 and a dataset of outer nodes, those references not included in the historiograph but that are cited by the papers in it, is complete and ready for display as the "Outer Node Table" 82 shown in FIG. 12.

Figure 8:
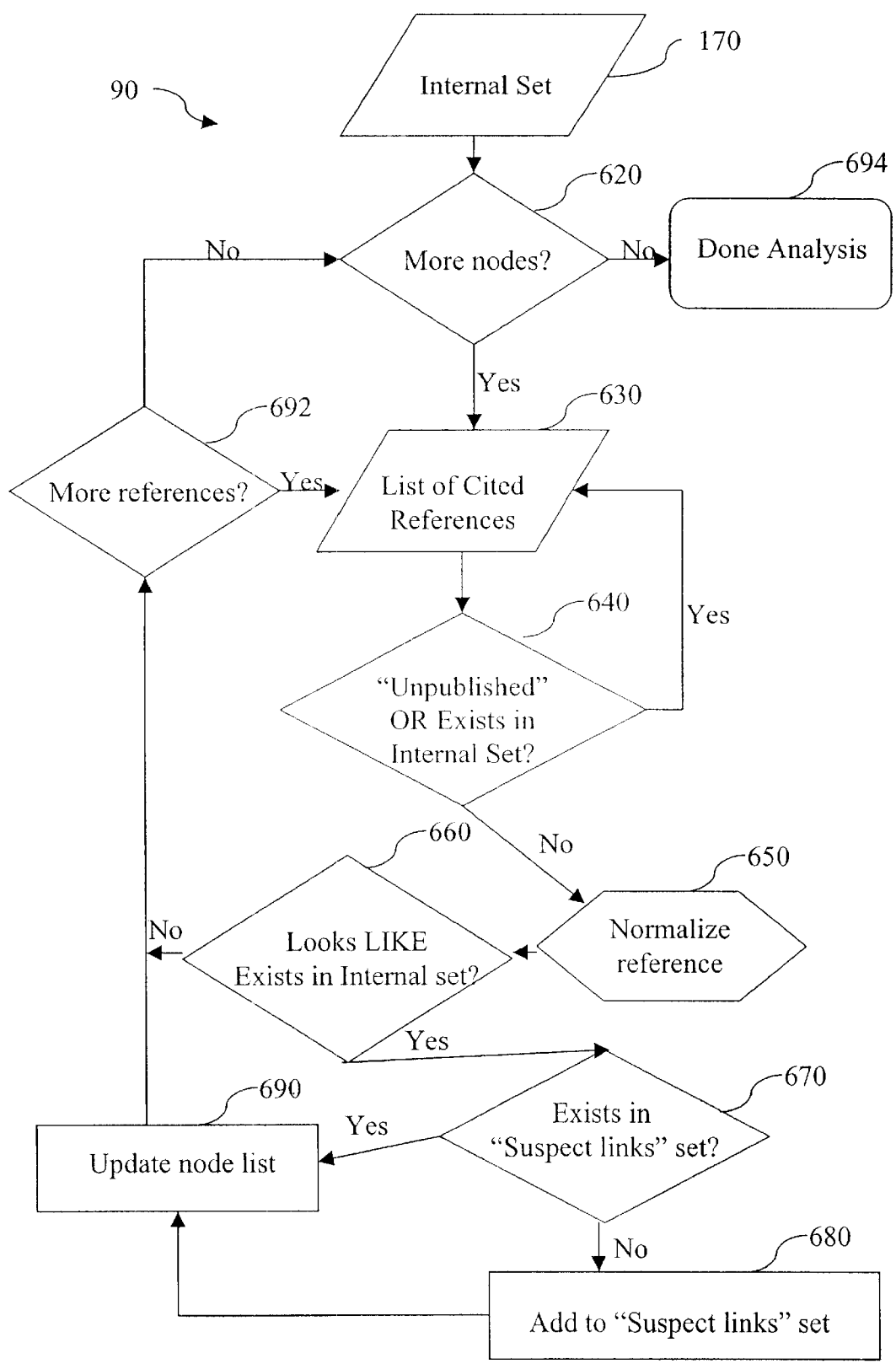
FIG. 8 is a diagram of the Suspect Links Analysis subprocess of the invention.

The Suspect Links Analysis 90 of the main process 10 is illustrated in FIG. 8. This subprocess checks the node data for faulty citation data and, if possible, correlates a faulty citation with a node in the historiograph. Operating on each node in the internal set 170 in turn 620, the subprocess 90 accesses the list of citation references 630 for a single node. A quick determination is made 640 whether the citation can be identified as referencing a paper that is already a member of the internal set 170. If so, that citation is passed and the next checked. If the citation cannot be determined to reference one of the nodes in the internal set, then the reference is normalized 650, which means that it is analyzed for content and format for each field (author, title, publication, date, volume, page) that appears in the records of the internal set of nodes. Then a comparison is performed 660 to determine if the record appears to be one that exists in the internal set. If not, it is discarded and either the next citation reference is analyzed 630, 640, or the next node is accessed 620 for processing. However, if the abnormal citation appears to correspond to a paper that is a node in the internal set, then a determination is made 670 whether it is already in the "suspect links" dataset and, if not, it is added to the dataset 680. Then the node list is updated to indicate that this particular node cites a reference that may appear in the historiograph data. If the comparison 660 of the normalized citation results in a very close correlation between the faulty citation and a node paper, a flag is attached to the record that triggers the message, shown in FIG. 13, that the citation "may refer to <node>", with the node identification data included. The Suspect Links table 92 is the product of this subprocess 90 and is used to generate the display shown in FIG. 13.

There are other ways to arrange and index the data assembled in the process that generates the historiograph so that useful information can be presented in direct tabular form and the details accessed by hot-linking. Some examples follow.

The format of the main index page of the historiograph can be modified as shown in FIG. 14. FIG. 14 is an illustration of an historiograph compiled by seeding the Process Input step with a subject matter word or phrase rather than the identity of any paper(s). The word or phrase is matched with the title field in the source database and papers having that word or phrase are selected for processing to create a citation network. Thus, not only the output format of the historiograph can be modified, the analytical technique be changed. Rather than the format illustrated in FIG. 1, the main index can be changed to display the complete bibliographic information of the individual nodes. In FIG. 14, node 2 is a 1979 article by Gleeson et al., the complete bibliographic record of which is shown on the main index page. In FIG. 1, only a shorthand version of the paper bibliographic record was provided.

Also in FIG. 14, the "Cited Nodes" column is a modified form of the "cites" column in FIG. 1. The number of cited nodes is all that is displayed in FIG. 14. That number is hot-linked to a detailed list of the cited nodes. For example, referring to Node 2 (Gleeson et al. paper) in FIG. 14, the number in the "Cited Nodes" column is a hot-linked "2", which means that the Gleeson et al. paper cites 2 other nodes in the historiograph. Clicking on the "2" yields the output table of FIG. 15, in which the Gleeson et al. node 2 paper is fully identified along with the 2 node papers that it cites (node 0 Anderson et al., and node 1 Gleeson et al.). This is the same information that was gathered to produce the main index and supporting detail of FIGS. 1 and 9–10. It is simply formatted and linked in a different way to produce the information in a tabular form that may be preferred for particular purposes.

Continuing with the example of FIG. 14, compared to FIG. 1, the number of times a node is cited by other nodes is listed under the heading "LCS", which stands for "local citation score." In FIG. 1, the number in brackets under the "cited" heading was the number of nodes that cited a particular node of interest. The node 7 Chesser paper in FIG. 1 was cited by 5 other nodes, each of which is identified by its node number in the same column with the "[5]." In FIG. 14, only the total number of citing nodes is given; for example, the node 2 Gleeson et al. paper of FIG. 14 is cited in 4 other node papers (see "4"under "LCS" column). Clicking on the "4" link yields the table shown in FIG. 16, in which the node 2 Gleeson paper is fully identified as are the 4 papers that cited the Gleeson paper as a reference. This is the same information that was available in FIG. 1 and the hot-linked numbers under its "cited" column; it is simply arranged differently for display.

There is another feature connected with the "LCS" column; it can sort the LCS scores and display the nodes in the order of their citation by other nodes. Clicking on the "LCS" column heading in FIG. 14 yields the tabular information display shown in FIG. 17. The main index of nodes has been sorted to place the most cited (by other nodes) node at the top, with the remaining nodes arranged in descending order of citation frequency by other nodes. Thus, the node 16 Fincher et al. paper, cited 166 times, is listed first. As in FIG. 14, clicking on the "166" hot-link in FIG. 17 will display all 166 citing node papers in full bibliographic detail (as in FIG. 16). The information display of FIG. 17, ordered by citation frequency within the nodal analysis, is a quick way to find the most cited paper(s) in the field of interest illustrated in this particular historiograph.

Referring back to FIG. 14, there is another column added to this main index page that was not in FIG. 1. The heading "GCS" stands for "global citation score" and is a number representing the number of citations to that particular node that were present in the entire citation index from which the historiograph data was assembled (e.g., the Web of Science index, Science Citation Index, Medline, PubSci, for instance). This figure includes citing papers that are not part of the historiograph because they are not nodes in the analysis. In FIG. 14, for example, the node 2 Gleeson paper has a local citation score of 4 (nodes) and a global citation score of 14 papers in all. The GCS column is also sortable by clicking on the "GCS" link. The result is shown in FIG. 18, where the node 89 Showalter paper has the highest global citation score (346). That means that the node 89 paper was cited in a total of 346 papers in the science citation index from which the historiograph was compiled. This quick reference is another way to learn which papers and authors may be the most influential in the history of a field of science.

The GCS and LCS figures can be compared to learn whether a particular node paper is important in the science field that the historiograph illustrates, and whether a node may represent a paper with significance to more than one field. A paper with a high LCS and comparable GCS is likely notable in the particular topical field being analyzed. But a paper with a moderate or low LCS for papers within the historiograph, compared to a very high GCS, may indicate that a paper that has some significance in the field of the present analysis likely was highly significant in a related, or even distinct, field of endeavor.

Other tabular displays previously illustrated can be enhanced to instantly deliver more information. For example, the node identifier link in FIG. 1, when clicked, yielded the display of FIG. 9 for node 12 (Berkele paper). FIG. 9 is a table that identifies the node paper's complete bibliographic data and shows the number of citation references in the paper ("Refs"), each node and the number of nodes cited by the node 12 paper ("cited"), and the node(s) and number of them that the node 12 paper cited ("cites"). Hot-linked node numbers in the FIG. 9 table allow the display of each node's bibliographic data. By comparison, clicking the node 2 link in FIG. 14 yields a display with all of the same information displayed in a bit more detail, shown in FIG. 19. The display includes the complete list (CR[26])) and number of papers cited by the node 2 paper, only two of which are nodes in the analysis. The two cited nodes are underlined (hot-linked to bibliographic data) in the list. Also displayed is the LCS, the same information as the "cited" number in FIG. 1, indicating the number of nodes that cite this paper. The GCS is indicated as "WoS CS" in FIG. 19, indicating that the Web of Science was the citation index that provided the data this analysis, and that 14 papers in the WoS cite to this paper.

The Ranked Author list of FIG. 10 can be enhanced as shown in FIG. 20. In this example of an enhanced Ranked Author list, three columns of information are added under the headings "TGCS", "TLCS", and "CS." Under the "CS" (citation score) heading is the number of that author's publications that appear in the historiograph. In FIG. 20, the first author, Clarke, has 29 papers in the historiograph. The "29" is hot-linked to a list of all 29 papers, which can be displayed by clicking the link to produce the table shown in FIG. 21. Clarke's TLCS (total local citation score), representing the number of times his papers are cited by other nodes, is 801. His TGCS (total global citation score) of 1330 indicates that his work is cited 1330 times in the database from which this historiograph was assembled.

Three more Figures illustrate the remaining data metrics compiled in the process of creating the historiograph of FIG. 14. FIG. 22 is the Ranked Journal List (only first page shown) compiled from the node publications in the analysis. As shown, the journal Plant Physiology was the most cited journal (34 cites) in the analysis partially represented in FIG. 14. In the upper left corner, the notation "Total: 116" indicates that a total of 116 journals are represented in the nodes of this historiograph.

FIG. 23 is the list of references not included as nodes in the historiograph that were cited by node papers in the historiograph. They are sorted from most to least cited and are displayed with the citation score ("LCS") for each. FIG. 24 is a modified (compared to FIG. 13) version of a potentially-missed citations list for this historiograph. In the FIG. 24 list, each node containing a potentially missed citation is listed with its full bibliographic data, then the potentially missed citation is listed below. In FIG. 24, the node 15 paper, a 1982 paper in the *Australian Journal of Plant Physiology*, contained a citation to "Pollard PC, 1981", which may be a cite to the paper at node 8. In fact, three nodes shown in FIG. 24 (15, 16, 18) contain citations to that same paper. Collectively, the tabular data associated with an historiograph assembled by the process of the present invention allow the researcher to obtain a most complete analysis of a publication history.

Figure 25:
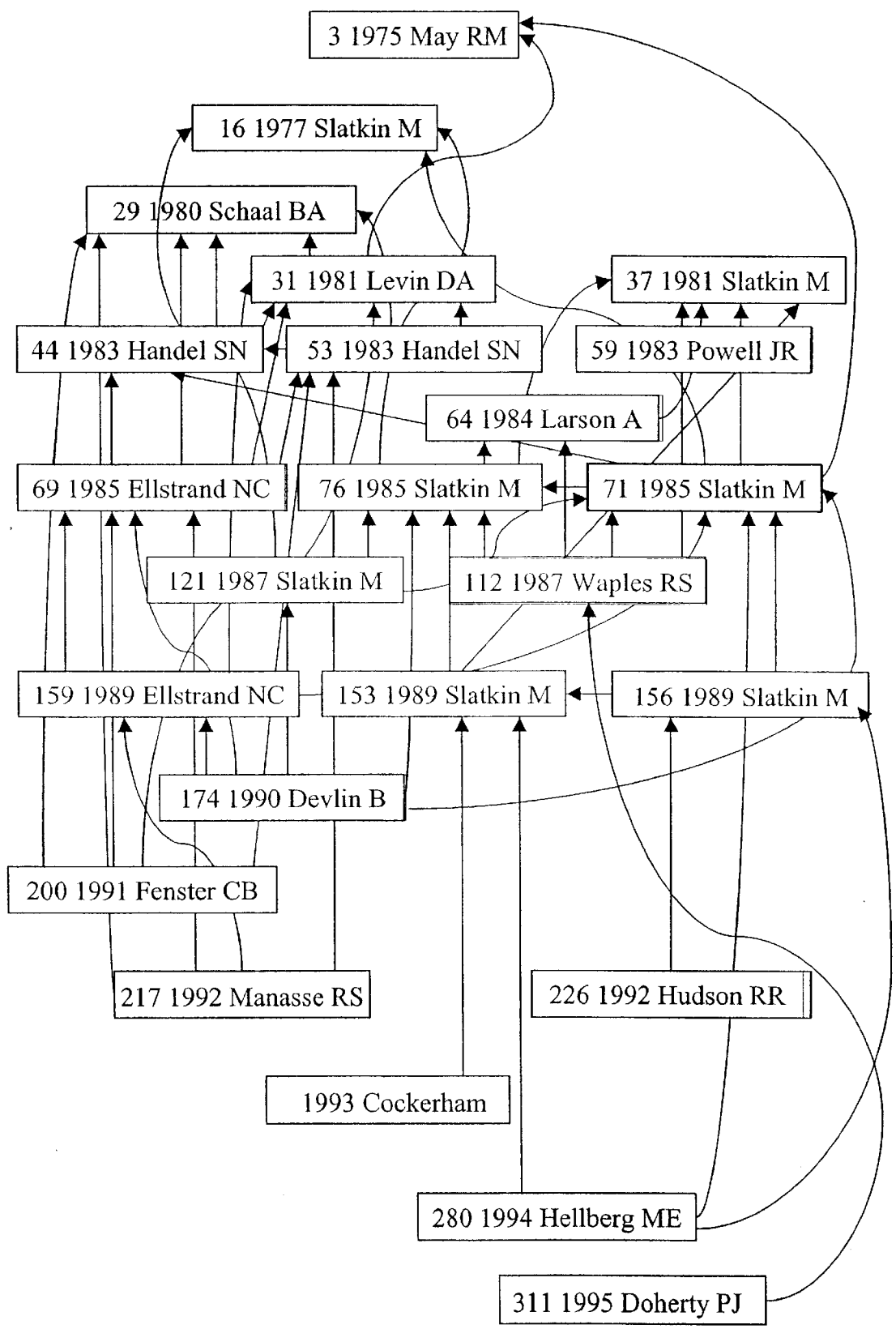
FIG. 25 is an example of a graphic output relating the nodes of the historiograph by citation and chronology.

Another form of graphic representation of the historiograph analysis is shown in FIG. 25. Certain nodes of the analysis represented by the graphic in FIG. 25 have been plotted from top to bottom in chronological order by year of publication. Each node is identified by number, such as the node 3 "May" publication in 1975 at the top of the Figure. Using available graphic programming techniques, the plotted nodes are shown linked by their citation references. For example, the node 31 "Levin" paper cites to the node 3 May paper. This type of graphic display delivers information very quickly. It can be seen, for instance, that the node 69 Ellstrand paper (1985) and the two Slatkin papers (nodes 76 and 71) in 1985 are very influential in later years, and that the node 29 Schaal 1980 paper and the node 37 Slatkin 1981 paper are primordial nodes for two separate citation branches in later years. In the display of FIG. 25, the boxes for each node, appearing on a computer screen, are hot-linked to the textual information in the analysis so that clicking on any node brings up its full record, as in FIG. 19.

Figure 26:
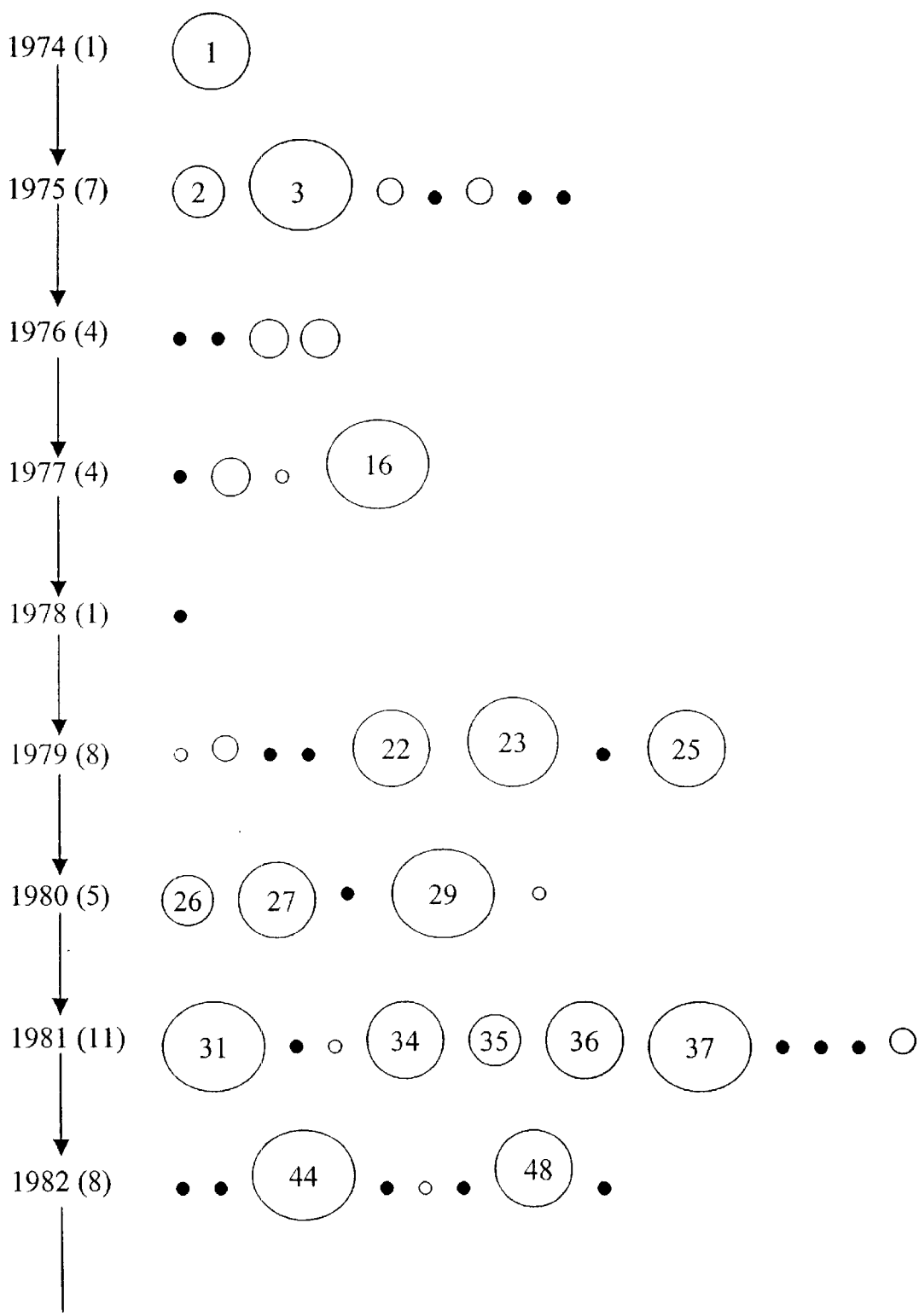
FIG. 26 is an example of a graphic output indicating the most cited nodes in each year of a historiograph analysis.

Yet another type of graphic display is shown in FIG. 26. This graphic display shows at a glance the relative importance of certain nodes in each year included in the historiograph analysis. In FIG. 26 each year is listed in order from the top with the number of nodes for that year in parenthesis next to the year (e.g., 1979 had 8 node papers). The nodes that are the most cited in that year are displayed enlarged to a size that gives a visual reference as to the number of citations to that node compared to the number of citations scored by another node in that year. For example, in FIG. 26 in the year 1979, there are eight bubbles shown, one for each node clustered in that year. They are nodes 18–25 (note that every node has a dot or bubble in the graphic, from 1 in 1974, 2 through 8 in 1975, 9 through 12 in 1976 and so on). Only the nodes having the largest number of citations have the node numbers inside the bubbles. The relative size of the bubbles in 1979 indicate that node 23 had the most citations, followed by node 25, then node 22. The other nodes in 1979 were not cited often enough to be shown enlarged to any great degree. Thus, at a glance the researcher can see the most cited nodes in the historiograph year by year and, by finding the largest bubbles in the display, the most cited nodes of all. What this display lacks is the interrelationship among the nodes, which is displayed in a graphic such as that in FIG. 25.

An historiograph may be compiled using search strategies other than selecting for input one or more papers as the "seeds" of the analysis. For example, a search may be initiated by subject matter. The process may be tailored to conduct subject matter searches by key words or other means. The historiograph of FIG. 14, and all of the analysis data that relates to it, was assembled by conducting a key word search on the topic "arabino-galactan" appearing in the titles of the publications in the source bibliographic citation database. In this instance, the process was modified to assign node numbers to all papers that referenced arabino galactan in their titles, which explains why some nodes (such as node 6) in the historiograph of FIG. 14 are not cited by other nodes and cite no other nodes. They are orphans in the field, but they do relate to the subject matter of the search. Similarly, an historiograph can be assembled for a single author by searching the citation database for papers published by the author, all papers she cites and those that cite her work. Thus, the input data that may be processed through a citation database for creation of an historiograph according to the process of the invention can vary according to the needs and interests of the researcher.

Just as the search strategy may be changed, so too can the criteria for designating a paper as a "node" in the analysis. In the previous example above, whether a paper became a node was determined by a check to determine if that paper cited any paper already designated as a node in the analysis. The criteria may be adjusted in the subprocess 50 for establishing the citation network (FIG. 2). The researcher may want to limit the designation of nodes to only those papers that contain cites to five or more other nodes, thus excluding peripheral publications and focusing only on those most centered on the subject matter. The resulting historiograph would contain fewer nodes, but they would represent a more concentrated analysis of the field or author of interest. Other modifications of node selection are possible, enabling a researcher to fine-tune the analysis for particular results. For example, an analysis may be directed to papers that cite only two or three authors in a field. Thus, only such papers would be designated to be nodes in the resulting historiograph.

Though reference has been made to citation databases as the source for constructing historiographs, other data sources may prove adaptable to the process. For example, the Internet has made many full text databases available to researchers in countless fields (United States and international patents are an example, as are various medical and science databases). The process of the invention can be easily adapted to conduct searches in full text databases using key words, title searches, author searches and the like. The results can be as comprehensive as the material in the database permits. Such searches can be used to analyze the content of a database to determine whether it contains sufficient information on a particular topic, or sufficient material produced and influenced by an important researcher. The possibilities are limited only by the imagination and the needs of the curious.

In the case of such full text database searches, the process would be modified slightly to extract from any full text document the bibliographic information that identifies the document itself, and the bibliographic information for all cited references in the document. The results of such searches can be formatted and displayed as shown in the Figures for ease of analysis and reference.

Figure 27:
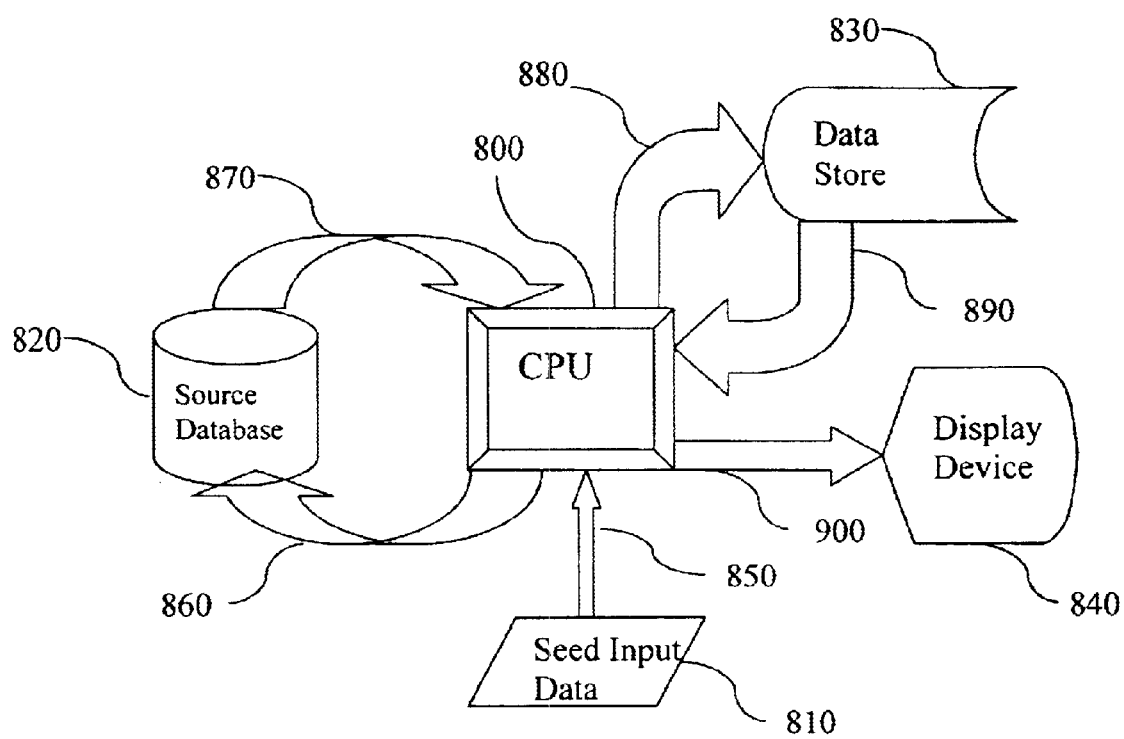
FIG. 27 is an illustration of an example computer system that may operate the process of the invention.

A general illustration of the computer and database system that can operate the process of the invention is shown in FIG. 27. The process, embodied in computer software, is operated by a central processing unit (CPU) 800 that interfaces with: input data 810, a source database 820, a data store 830 where the citation network is stored and assembled, and a display device 840 for displaying the graphical form of the historiograph output. The CPU 800 takes the seed input data 810 and processes it through the source database 820, passing 860 the seed data to the source database 820 where it is processed for citations. The citations are returned 870 through the CPU 800 to be stored 880 in the data store 830 and assembled into the citation network. The citations returned to the CPU in the first iteration are themselves processed 860 into the source database 820 to discover more citations, these iterations continuing until all of the citations have been processed and all resulting citation information is stored in the data store 830 in the citation network. Then, the citation network is accessed 890 and formatted, then passed 900 to the display device 840 for display to the user. The source database 820 may be colocated with the CPU or accessed by remote communication (telephone, modem, WAN, LAN, internet). The data store 830 also may be part of the CPU (internal memory or an attached peripheral) or remotely located. And the display device may be a standalone terminal in a network or part of a desktop system. The specific structure of the system is as flexible as the technology permits at any time.

A person skilled in the art will perceive that each of the processes described above can be performed in somewhat different ways to obtain the same or similar results, all of which are within the scope of the invention. Similarly, the displays shown in the various Figures may be arranged in alternate forms that ultimately reveal the same or similar information. None of the description of the minute steps of the processes or the detail in the displays is intended to limit the scope of the invention. Resort must be had to the appended claims to discover the legal scope of the invention.

We claim:

1. An automated process for operating a computer system to create an historiograph of bibliographic information for publications, comprising the steps:

processing bibliographic information for one or more seed publications through at least one source database, said at least one source database being one of: a publication citation index database, a full text database, an abstract database;

said processing comprising identification of publications citing to, and cited by, said one or more seed publications;

processing the identified publications through said at least one source database for identification of further publications citing to, and cited by, said identified publications in successive iterations until all identified publications have been processed;

assigning node identifying designations to qualifying publications according to predetermined criteria;

compiling a citation network comprising identified node publications, said citation network linking to each node publication the designations of other node publications citing to, and cited by, said each node publication;

displaying said citation network of node publications on a display device in an organized graphical form showing the relationship of each node publication to the other node publications in said citation network.

2. The process of claim 1, further comprising the step:

compiling a plurality of metrics on the node publications, said plurality of metrics comprising the number of citations to a node publication, and the number of citations by a node publication to other node publications.

3. The process of claim 2, further comprising the step:

displaying the compiled metrics in the graphical display.

4. The process of claim 1, further comprising the step:

embedding hyperlinks within the graphical display to directly access bibliographic data on nodes in the display.

5. The process of claim 2, further comprising the step:

embedding hyperlinks within the graphical display to directly access and display metric data compiled about the node publications.

6. The process of claim 2, wherein the plurality of metrics further comprises;

a list of authors of said node publications, ranked by frequency of appearance in the historiograph.

7. The process of claim 2, wherein the plurality of metrics further comprises;

a list of the journals appearing in the historiograph, ranked by frequency of appearance.

8. The process of claim 2, wherein the plurality of metrics further comprises;

identification of publications outside the citation network, said publications being any that are cited by node publications but fail to meet the predetermined criteria for inclusion as nodes in the citation network, and the number of times said outside publications are cited.

9. The process of claim 1, wherein one parameter of the organized graphical form of the display is chronological ordering of the node publications.

10. The process of claim 1, wherein the bibliographic information processed to generate the historiograph comprises at least one author's name.

11. The process of claim 1, wherein the bibliographic information processed to generate the historiograph comprises at least one word in a publication title, abstract or full text.

12. The process of claim 1, wherein the bibliographic information processed to generate the historiograph comprises at least one publication name.

13. The process of claim 2, wherein the plurality of metrics further comprises a compilation of publications that do not meet the predetermined criteria for designation as nodes in the historiograph though said publications are cited by nodes in the historiograph.

14. An automated process for operating a computer system to create an historiograph of bibliographic information for publications, comprising the steps:

processing bibliographic information for one or more seed publications through at least one source database, said at least one source database being one of: a publication citation index database, a full text database, an abstract database;

said processing comprising identification of publications citing to, and cited by, said one or more seed publications;

processing the identified publications through the said at least one source database for identification of further publications citing to, and cited by, said identified publications in successive iterations until all identified publications have been processed;

assigning node identifying designations to qualifying publications according to predetermined criteria;

compiling a citation network comprising identified node publications, said citation network linking to each node publication the designations of other node publications citing to, and cited by, said each node publication;

displaying said citation network of node publications on a display device in an organized graphical form showing the relationship of each node publication to the other node publications in said citation network;

compiling a plurality of metrics on the node publications, said plurality of metrics comprising the number of citations to a node publication, the number of citations by a node publication to other node publications, and a compilation of publications that do not meet the predetermined criteria for designation as nodes in the historiograph though said publications are cited by nodes in the historiograph;

wherein said compilation is organized and displayed according to the, frequency of citation to each publication that did not meet the criteria for designation as nodes.

15. An automated process for operating a computer system to create an historiograph of bibliographic information for publications, comprising the steps:

processing bibliographic information for one or more seed publications through at least one source database, said at least one source database being one of: a publication citation index database, a full text database, an abstract database;

said processing comprising identification of publications citing to, and cited by, said one or more seed publications;

processing the identified publications through the said at least one source database for identification of further publications citing to, and cited by, said identified publications in successive iterations until all identified publications have been processed;

assigning node identifying designations to qualifying publications according to predetermined criteria;

compiling a citation network comprising identified node publications, said citation network linking to each node publication the designations of other node publications citing to, and cited by, said each node publication;

displaying said citation network of node publications on a display device in an organized graphical form showing the relationship of each node publication to the other node publications in said citation network;

compiling a plurality of metrics on the node publications, said plurality of metrics comprising the number of citations to a node publication, and the number of citations by a node publication to other node publications, wherein the plurality of metrics further comprises a list of publications, identified by their bibliographic data discovered in the processing steps, that may match publications already designated as nodes in the historiograph but for a minor anomaly in the citation data.

16. The process of claim 15, wherein said list of publications that may match nodes in the historiograph is organized and displayed.

17. The process of claim 1, wherein the graphical display comprises a tabular arrangement of nodes organized in order determined by one of the parameters: publication date, frequency of citation by other nodes, author.

18. The process of claim 3, wherein the number of citations to a node metric in the display may be sorted in real time and rearrange the display such that the nodes are displayed according to frequency of citation.

19. The process of claim 3, wherein an additional metric compiled in the processing steps is the number of citations to a node publication that occur in all of the publications contained in the source database.

20. The process of claim 1, wherein the graphical display comprises a relational illustration showing each node as a singular graphical element, all of the nodes arranged in chronological sequence, and each node linked to the other nodes to show citation relationships by arrows indicating citation to or by the respective linked nodes.

21. The process of claim 1, wherein the graphical display comprises a relational illustration showing nodes arranged in chronological order, and shown as bubbles of varying size, said size determined by the number of citations to the node.

* * * * *